US010595349B2

(12) United States Patent
Nilsson et al.

(10) Patent No.: US 10,595,349 B2
(45) Date of Patent: Mar. 17, 2020

(54) QUALITY OF SERVICE IN NEURAL HOST NETWORK

(71) Applicant: Telefonaktiebolaget LM Ericsson (publ), Stockholm (SE)

(72) Inventors: Daniel Nilsson, Älvängen (SE); Qian Chen, Mölndal (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/075,005

(22) PCT Filed: Feb. 6, 2017

(86) PCT No.: PCT/EP2017/052571
§ 371 (c)(1),
(2) Date: Aug. 2, 2018

(87) PCT Pub. No.: WO2017/134312
PCT Pub. Date: Aug. 10, 2017

(65) Prior Publication Data
US 2019/0007985 A1 Jan. 3, 2019

Related U.S. Application Data

(60) Provisional application No. 62/347,871, filed on Jun. 9, 2016, provisional application No. 62/326,138, filed
(Continued)

(51) Int. Cl.
H04W 76/12 (2018.01)
H04W 12/02 (2009.01)
(Continued)

(52) U.S. Cl.
CPC ........... H04W 76/12 (2018.02); H04W 12/02 (2013.01); H04W 12/06 (2013.01); H04W 16/14 (2013.01);
(Continued)

(58) Field of Classification Search
CPC ..... H04W 76/12; H04W 16/14; H04W 76/15; H04W 12/06; H04W 76/10; H04W 12/02; H04W 92/06; H04W 92/04
See application file for complete search history.

(56) References Cited

U.S. PATENT DOCUMENTS

2011/0216743 A1  9/2011 Bachmann et al.
2012/0113959 A1  5/2012 Sugizaki et al.
(Continued)

FOREIGN PATENT DOCUMENTS

EP      2863683 A1   4/2015
EP      2914048 A1   9/2015
WO  WO 2011053201 A1  5/2011

OTHER PUBLICATIONS

International Search Report and Written Opinion of the International Searching Authority, PCT/EP2017/052571, dated May 19, 2017, 11 pages.
(Continued)

Primary Examiner — Marcos L Torres
(74) Attorney, Agent, or Firm — Sage Patent Group

(57) ABSTRACT

Method for an ePDG in a MNO network, the MNO network comprising an access point, an MME, a Serving Gateway, a MNO PGW providing MNO IP services, and the ePDG, wherein the ePDG, may provide PDN services to UEs of a NH network; the NH network comprising an NH-AP communicating with the ePDG. A UE is adapted for connecting to the MNO network; the UE being adapted for finding a NH cell and engaging in setting up a connection in the NH network between the UE and the NH-AP. The ePDG engaging in setting up a first MNO bearer between the MNO ePDG and the MNO PGW; engaging in setting up a first IPsec tunnel between the UE and the MNO ePDG; engaging setting up a second MNO bearer between the MNO ePDG and the MNO PGW, and requesting setting up a second
(Continued)

IPsec tunnel between the UE and the MNO ePDG, for providing differentiated services for the UE.

25 Claims, 13 Drawing Sheets

Related U.S. Application Data on Apr. 22, 2016, provisional application No. 62/291,646, filed on Feb. 5, 2016.

(51) Int. Cl.
*H04W 12/06* (2009.01)
*H04W 76/15* (2018.01)
*H04W 76/10* (2018.01)
*H04W 16/14* (2009.01)
*H04W 92/04* (2009.01)
*H04W 92/06* (2009.01)

(52) U.S. Cl.
CPC ........... *H04W 76/10* (2018.02); *H04W 76/15* (2018.02); *H04W 92/04* (2013.01); *H04W 92/06* (2013.01)

(56) References Cited

U.S. PATENT DOCUMENTS

| | | | |
|---|---|---|---|
| 2013/0094487 A1* | 4/2013 | Rui | H04M 15/66 370/338 |
| 2014/0036872 A1 | 2/2014 | Shaheen | |
| 2017/0111826 A1* | 4/2017 | Sankar | H04W 28/20 |

OTHER PUBLICATIONS

MulteFire, Think Small Cell, White Paper, MulteFire lights up the path for universal wireless service, David Chambers, May 2016, pp. 1-10.

3GPP TS 23.401 v13.4.0 (Sep. 2015), $3^{rd}$ Generation Partnership Project; Technical Project Specification Group Services and System Aspects; General Packet Radio Service (GPRS) enhancements for Evolved Universal Terrestrial Radio Access Network (E-UTRAN) access (Release 13); Sep. 2015, pp. 1-334.

3GPP TS 23.402 v13.4.0 (Dec. 2015); $3^{rd}$ Generation Partnership Project; Technical Project Specification Group Services and System Aspects; Architecture enhancements for non-3GPP accesses (Release 13); Dec. 2015, pp. 1-298.

MulteFire, Admin/MulteFire, Comcast, website accessed Feb. 10, 2017 (http://www.multefire.org/author/admin/page/6/), p. 1.

Fierce Wireless, Monica Alleven, MulteFire Alliance wraps up Release 1.0 specification, Jan. 17, 2017, pp. 1-3.

MulteFire, MulteFire Release 1.0, Technical Paper, A New Way to Wireless, Jan. 17, 2017, pp. 1-25.

Kent, S, BBN Technologies, The Internet Society, Network Working Group, Standards Track, IP Encapsulating Security Payload (ESP), RFC 4303, Dec. 2005, pp. 1-36.

Kaufman, C., et al. Microsoft, Internet Engineering Task Force (IETF); Standards Track, Internet Key Exchange Protocol Version 2 (IKEv2), Sep. 2010, pp. 1-138.

Qualcomm, OnQ Blog—Matt Branda, Introducting MulteFire LTE-like performance with Wi-Fi-like simplicity; Jun. 11, 2015, pp. 1-7.

\* cited by examiner

QUALITY OF SERVICE IN NEURAL HOST NETWORK

CROSS REFERENCE TO RELATED APPLICATIONS

This application is a 35 U.S.C. § 371 national stage application of PCT International Application No. PCT/EP2017/052571 filed on Feb. 6, 2017, which in turn claims domestic priority to U.S. Provisional Patent Application No. 62/291,646, filed on Feb. 5, 2016, U.S. Provisional Patent Application No. 62/326,138, filed on Apr. 22, 2016, and U.S. Provisional Patent Application No. 62/347,871, filed on Jun. 9, 2016, the disclosures and content of which are incorporated by reference herein in their entirety.

TECHNICAL FIELD

The embodiments disclosed herein are directed to neutral host networks and methods and apparatuses therefore.

BACKGROUND

MulteFire™ (MF) is an access technology that is designed to bring the benefits of LTE technology to unlicensed spectrum, e.g. at 5 GHz. Different deployment scenarios for MF are being investigated. One aspect of MF is denoted the "Standalone Deployment Scenario with External Interworking" which can also be called Neutral Host (NH) deployment.

A Neutral Host, NH, may be an entity which typically has premises and wireless infrastructure, such as an airport, a building complex or a warehouse. The NH is not normally seen as a Mobile Network Operator, MNO.

One role of MulteFire™ network is to provide IP services. In this case, the standalone MulteFire™ Network is connected to external entities. The NH may offer services to customers such as Internet access via MulteFire™. The access technology may be any other access technology such as for instance LTE, or LTE-unlicensed.

An MNO and NH may share a business interest in offering the IP services of the NH to MNO customers, that is, offer IP services in a fluent manner, without requiring any special logging in for the customer, thus saving licensed bandwidth of the MNO network. Many Wi-Fi networks of NH's requires logging in and registration before the user can use them.

FIG. 1 depicts such a deployment scenario of a MulteFire™ network that can interact with external Authentication, Authorization and Accounting, AAA, servers of Participating Service Provider(s). For the case when the Participating Service Provider is a Mobile Network Operator, MNO, SIM based credentials are used. In other cases, other type of credentials can also be used.

The MF CN may be connected to an IP network that is also connected to a 3GPP EPC and in this way provide access to its subscribers to Mobile Network Operator's (MNO's) IP Services. However, in this deployment scenario this is a service of 3GPP EPC and not provided by the MulteFire™ network.

Typically, the dotted line between a UE and an MNO is realized by IKE (Internet Key Exchange)/IPsec (IP Security) using the non-3GPP untrusted access solution (3GPP TS23.402 V13.4.0 (2015-12)).

SUMMARY

It is object to improve services for UE's seeking connection to a NH network.

This object has been accomplished by a method for a NH, network, a Mobile Network Operator, MNO, network, and a User Entity, UE, the MNO network comprising an access point, such as an LTE eNodeB, a Mobility Management Entity, MME, a Serving Gateway, a MNO Packet Gateway, PGW, (MNO_PGW) providing MNO Internet Protocol, IP, services such as Internet;
the Evolved Packed Data Gateway, wherein the ePDG, may provide Packet Data Connection, PDN, services to user entities of a NH network;
the NH network comprising an NH access node, NH-AP, communicating with the ePDG. The method comprises
    the UE connecting to the MNO network;
    the UE finding a NH cell; and
    the UE engaging in setting up a connection in the NH network between the UE and the NH-AP;
    the ePDG engaging in setting up a first MNO bearer between the MNO ePDG and the MNO PGW;
    the ePDG engaging in setting up a first IPsec tunnel between the UE and the MNO ePDG;
    the ePDG engaging setting up a second MNO bearer between the MNO ePDG and the MNO PGW, and
    the ePDG requesting setting up a second IPsec tunnel between the UE and the MNO ePDG, for providing differentiated services for the UE,
    the UE and the ePDG engaging in setting up a second IPsec tunnel between the UE and the MNO ePDG, for providing differentiated services.

The above object has also been accomplished by a method for user entity, UE, in a Neutral Host, NH, network and a Mobile Network Operator, MNO, network, the MNO network comprising an access point, such as an LTE eNodeB, a Mobility Management Entity, MME, a Serving Gateway, a MNO Packet Gateway providing MNO Internet Protocol, IP, services such as the Internet; the MNO network moreover comprising an Evolved Packed Data Gateway, ePDG, which may be used to provide Packet Data Connection, PDN, services to user entities of the NH network; the NH network comprising an access node, a Mobility Management Entity, MME and a Gateway;
the NH gateway being connected to the ePDG for providing connectivity to the NH_PGW connecting further to MNO IP services such as the Internet.

The method comprises
    the UE connecting to the MNO network;
    the UE finding a NH cell and engaging in setting up a connection in the NH network between the UE and the NH-AP;
wherein
the ePDG being adapted for engaging in setting up a first MNO bearer between the MNO ePDG and the MNO PGW;
    the UE engaging in setting up a first IPsec tunnel between the UE and the MNO ePDG; the ePDG being adapted for engaging setting up a second MNO bearer between the MNO ePDG and the MNO PGW, and
upon the ePDG requesting setting up a second IPsec tunnel between the UE and the MNO ePDG, for providing differentiated services for the UE,
the UE
    the UE responding with a response message to the request for setting up of the second IPsec tunnel; and
    the UE engaging in setting up a second IPsec tunnel between the UE and the MNO ePDG, for providing differentiated services.

A corresponding apparatus have been provided, namely a user entity, UE, in a Neutral Host, NH, network and a Mobile Network Operator, MNO, network, the MNO network comprising an access point, such as an LTE eNodeB, a Mobility Management Entity, MME, a Serving Gateway, a MNO Packet The gateway is providing MNO Internet Protocol, IP, services such as the Internet. The MNO network moreover comprises an Evolved Packed Data Gateway, ePDG, which may be used to provide Packet Data Connection, PDN, services to user entities of the NH network; the NH network comprising an access node, NH-AP, a Mobility Management Entity, MME and a Gateway. The NH gateway is being connected to the ePDG for providing connectivity to the NH_PGW connecting further to MNO IP services such as the Internet; the UE comprising an interface; a processor and a memory, the UE being adapted for connecting to the MNO network; finding a NH cell and engaging in setting up a connection in the NH network between the UE and the NH-AP;

wherein the ePDG being adapted for engaging in setting up a first MNO bearer between the MNO ePDG and the MNO PGW;

the UE engaging in setting up a first IPsec tunnel between the UE and the MNO ePDG;

the ePDG being adapted for engaging setting up a second MNO bearer between the MNO ePDG and the MNO PGW, and upon the ePDG requesting setting up a second IPsec tunnel between the UE and the MNO ePDG, for providing differentiated services for the UE, the UE being adapted for responding with a response message to the request for setting up of the second IPsec tunnel; and the UE engaging in setting up a second IPsec tunnel between the UE and the MNO ePDG, for providing differentiated services.

The above object has been further accomplished by a method for an Evolved Packed Data Gateway, ePDG, in a Mobile Network Operator, MNO, network, the MNO network comprising an access point, such as an LTE eNodeB, a Mobility Management Entity, MME, a Serving Gateway, a MNO Packet Gateway, PGW, providing MNO Internet Protocol, IP, services such as Internet;

the Evolved Packed Data Gateway, wherein the ePDG, may provide Packet Data Connection, PDN, services to user entities of a NH network;

the NH network comprising an NH access node, NH-AP, communicating with the ePDG; wherein a UE is adapted for connecting to the MNO network;

the UE being adapted for finding a NH cell and engaging in setting up a connection in the NH network between the UE and the NH-AP;

the method comprising the ePDG engaging in setting up a first MNO bearer between the MNO ePDG and the MNO PGW;

the ePDG engaging in setting up a first IPsec tunnel between the UE and the MNO ePDG;

the ePDG engaging setting up a second MNO bearer between the MNO ePDG and the MNO PGW, and the ePDG requesting setting up a second IPsec tunnel between the UE and the MNO ePDG, for providing differentiated services for the UE.

A corresponding apparatus has been provided for accomplishing the above object, that is, an Evolved Packed Data Gateway, ePDG, in a Mobile Network Operator, MNO, network, the MNO network comprising an access point, such as an LTE eNodeB, a Mobility Management Entity, MME, a Serving Gateway, a MNO Packet Gateway, PGW, providing MNO Internet Protocol, IP, services such as Internet; the Evolved Packed Data Gateway, wherein the ePDG, may provide Packet Data Connection, PDN, services to user entities of a NH network. The NH network comprising an NH access node, NH-AP, communicating with the ePDG; wherein a UE is adapted for connecting to the MNO network; the UE being adapted for finding a NH cell and engaging in setting up a connection in the NH network between the UE and the NH-AP. The ePDG comprising an interface, IF_EP a processor PCU-EP and a memory, MEM-EP, adapted to engage in setting up a first MNO bearer between the MNO ePDG and the MNO PGW;

engage in setting up a first IPsec tunnel between the UE and the MNO ePDG;

engage in setting up a second MNO bearer between the MNO ePDG and the MNO PGW, and requesting setting up a second IPsec tunnel between the UE and the MNO ePDG, for providing differentiated services for the UE. According to certain embodiments of the present invention, a method is described where the UE get notified from the MNO network when a dedicated bearer is created in the MNO network.

The UE can, based on this notification, initiate resource allocation in the Neutral Host, NH, network. By this, the capability of the NH network can be fully utilized in terms of service differentiation and provide better services than other unmanaged access networks.

Embodiments of the invention may be applied for NH networks based on LTE-unlicensed or MulteFire™ technology. Embodiments of the invention may however be applied for any neutral host deployment that is capable of service differentiation but using the non-3GPP untrusted solution to access the MNO IP services.

Further advantages of certain embodiments of the invention will appear from the following detailed description of particular embodiments of the invention.

BRIEF DESCRIPTION OF THE DRAWINGS

In FIG. 3, there is shown an MNO network and a NH network. The MNO network comprises an access point MNO_AP, such as an LTE eNodeB, a MME, MNO_MME, a Serving Gateway, MNO_SGW. A MNO_PGW, connected to the MNO_SGW over the S5 interface, is providing MNO IP services such as the Internet which provided over the SGi interface.

Moreover, the MNO network comprises an Evolved Packed Data Gateway, ePDG, MNO_ePDG, which may be used to provide Packet Data Connection, PDN, services through the EPC core network that can be offered to user entities of the NH network through e.g. Wi-Fi. The MNO ePDG is connected to the MNO_PGW over the s2b interface.

The NH network comprises an access node NH-AP, such as MulteFire™ access point, a MME, NH_MME, and a Gateway, NH_GW that may be constituted by the combined nodes of a Serving Gateway Node and a Packet Data Network Gateway.

The NH gateway is communicating with the ePDG. A UE attached to the NH network can thus communicate through the NH nodes over the SWu-N interface and through the ePDG and further on to the MNO_PGW for accessing MNO IP services such as MMS, IMS services or Internet for that matter, although the NH network could already be offering Internet. The ePDG is facilitating connectivity of untrusted access technologies to the core network such as Wi-Fi.

A PCRF (Policy and Charging Rules Function) node is further shown connecting to the MNO_PGW on the Gx interface. The PCRF aggregates information to and from the network, operational support systems, and other sources (such as portals) in real time, supporting the creation of rules and then automatically making policy decisions for each subscriber active on the network. Such a network might offer multiple services, quality of service (QoS) levels, and charging rules.

It is noted that the ePDG node is currently limited by providing all IP streams through the same default user plane connection for a given UE for the connection between the UE and the ePDG. Within one PDN connection the UE can actually create multiple PDN connections and by that get separate IP streams on different user plane connections. However, his cannot be used to differentiate services within one PDN connection (like voice and video within one IMS PDN connection).

In the following, a method according to a particular embodiment of the invention is provided for offering differentiated services through an access point of a NH network.

In the following embodiment, an end-to-end procedure for the setup of resources in MNO and NH will be explained, by further reference to FIGS. 4-7.

In effect to the setup of the various bearers, a first internet protocol address IP@1 is identifying the UE at a virtual location corresponding to the NH_GW. A further Internet protocol address IP@3 is representing the UE at the location of the MNO_PGW.

Figure 4:
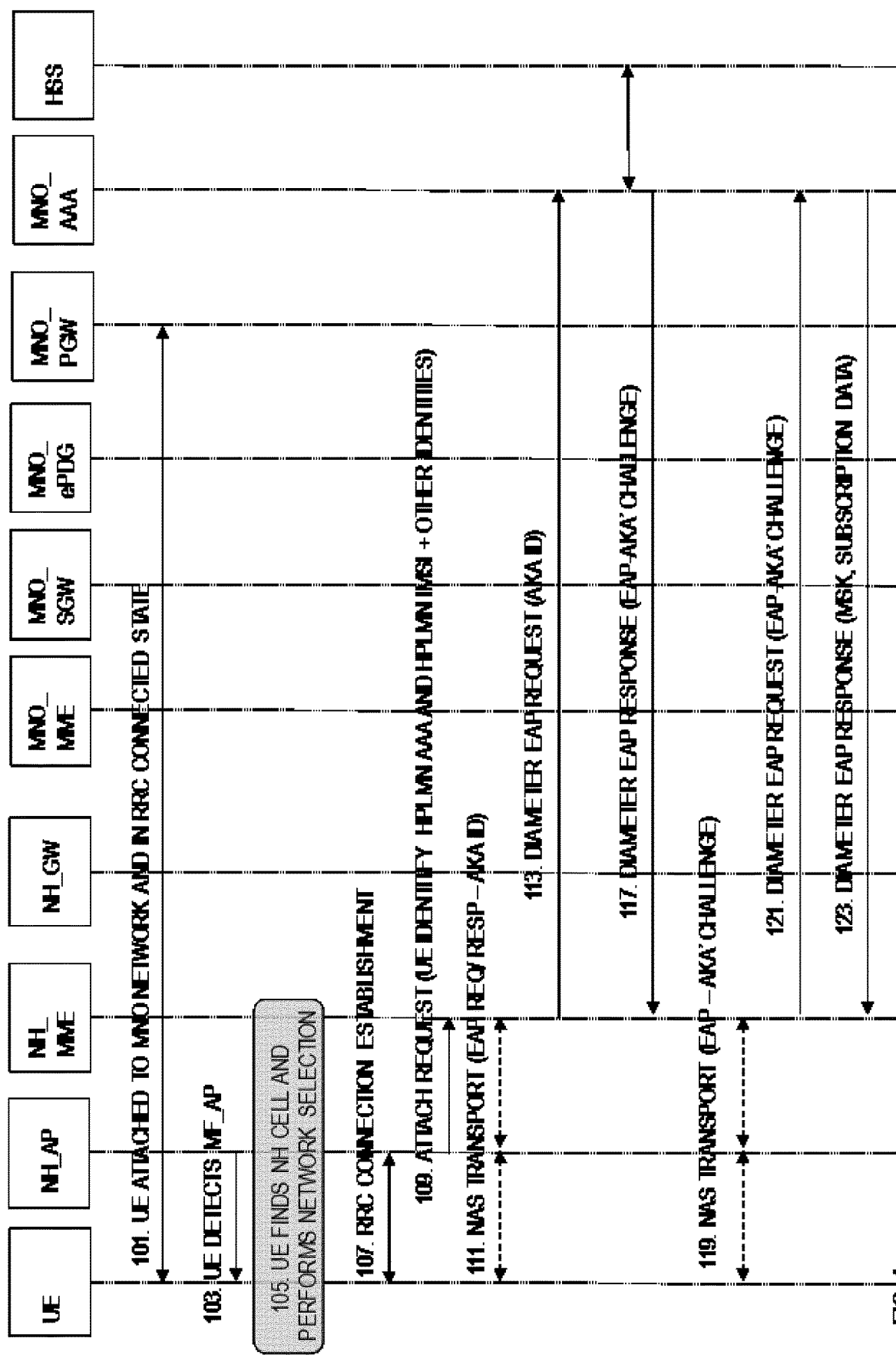
FIGS. 4-7 show signalling diagrams relating an embodiment of a method pertaining to the network shown in FIG. 3.

In FIG. 4, in step 101, by example, the UE is attached to a MNO network and is in a RRC CONNECTED state. This connection corresponds to an ordinary connection by for instance LTE. When that is the case, Internet service is provided to the user entity in a ubiquitous and fluent way requiring no special log-in procedures.

In a next step, the user enters the space of the NH and the UE detects in step 103 the NH_AP offering for instance MulteFire™ access in unlicensed frequency bands. The UE finds the NH cell and performs network selection in step 105.

Then follows, in step 107, RRC connection establishment to the NH_AP. The NH_AP in turn, 109, performs an ATTACH REQUEST (UE identify HPLMN (Home Public Land Mobile Network) AAA (Authentication, Authorization, and Accounting) and HPLMN IMSI (International Mobile Subscriber Identity)+other identities) directed to the NH_MME.

Then follows, 111, NAS (Network Access Stratum) TRANSPORT (EAP REQ/RESP—AKA ID) between the NH_MME, NH_AP and the UE. The NH_MME performs 113 DIAMETER EAP REQUEST (AKA ID) to a MNO_AAA server including SIM (Subscriber Identity Module) credentials of the UE. The AAA server communicates with a HSS for initiating communication of subscription details pertaining to the UE and the MNO_AAA server 115 fetches UE credentials.

Subsequently, a message 117 DIAMETER EAP RESPONSE (EAP-AKA' challenge) is issued from the MNO_AAA server to the NH_MME. this information is further transferred by means of 119 NAS TRANSPORT (EAP—AKA' challenge) to the UE.

Then follows a 121 DIAMETER EAP REQUEST (EAP-AKA' challenge) from the NH_MME to the MNO_AAA and a 123 DIAMETER EAP RESPONSE (MSK, subscription data) is sent back.

Figure 3:
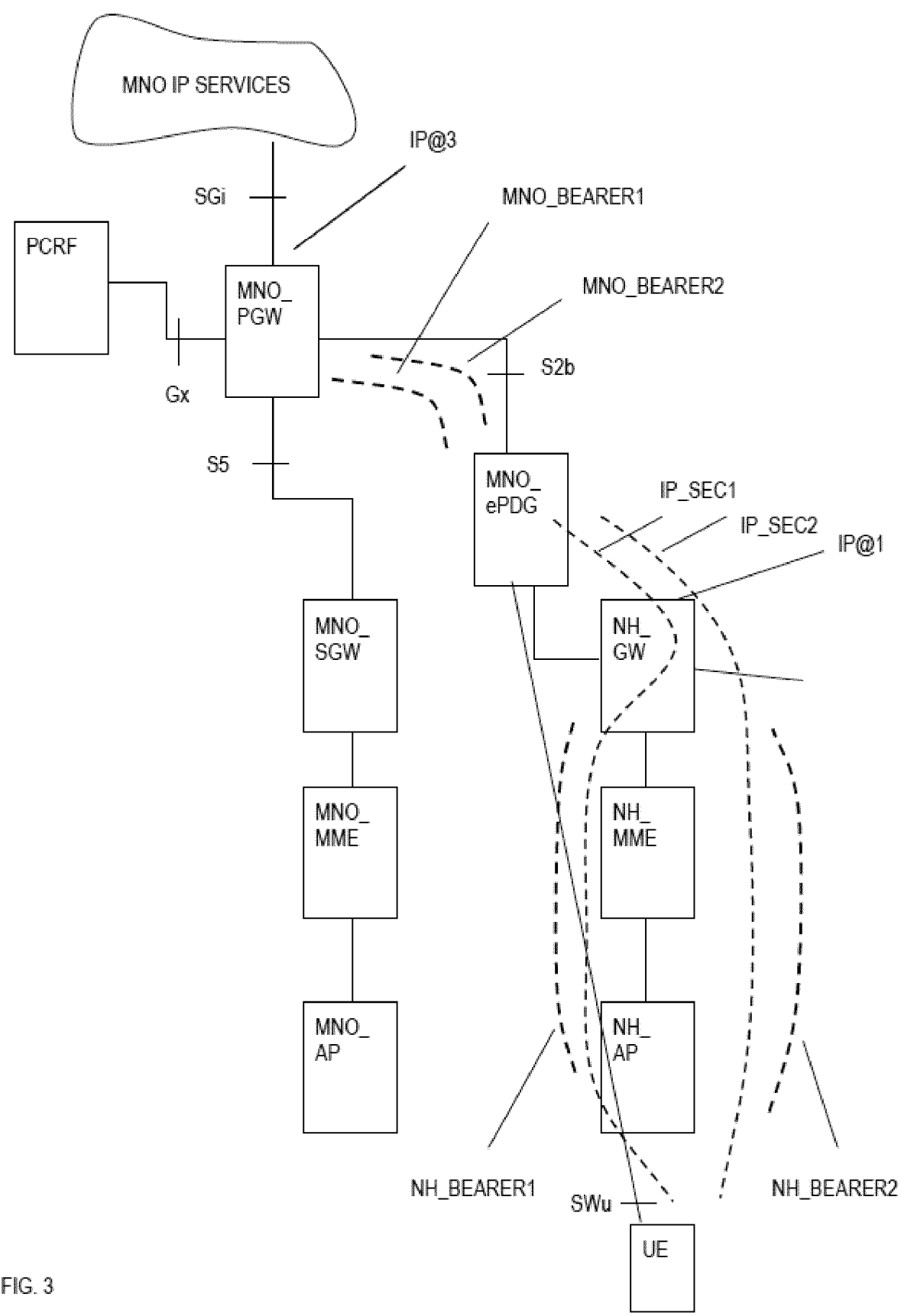
FIG. 3 shows an embodiment of a NH network and Mobile Operator Network, MNO, according to an embodiment of the invention.
Figure 5:
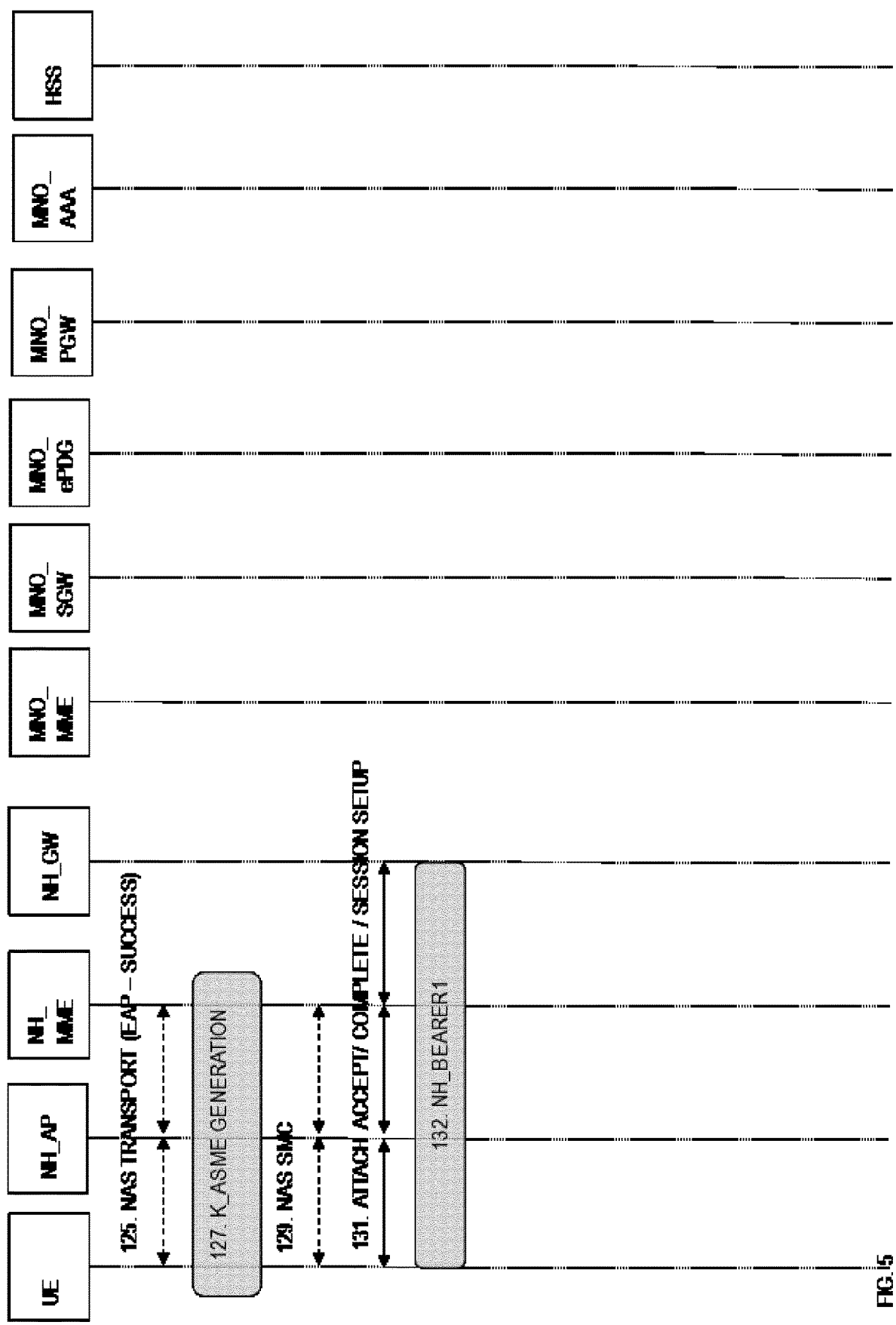

The procedure follows in FIG. 5 by 125 NAS TRANSPORT (EAP—SUCCESS) signalling between the UE, the NH_AP and the NH_MME. Then follows 127 K_ASME generation and 129 NAS SMC. Finally, in 131 ATTACH ACCEPT/COMPLETE/SESSION SETUP signalling is undertaken between the UE and the NH_GW and in 132 a NH_BEARER1 is established between the UE and the NH_GW as also indicated in FIG. 3. The NH_BEARER1 can be seen as a default bearer on which Internet data services may be provided to the UE in the NH network in a manner which resembles data services being provided by Wi-Fi as a secondary data connection to a 3GPP data connection.

Figure 6:
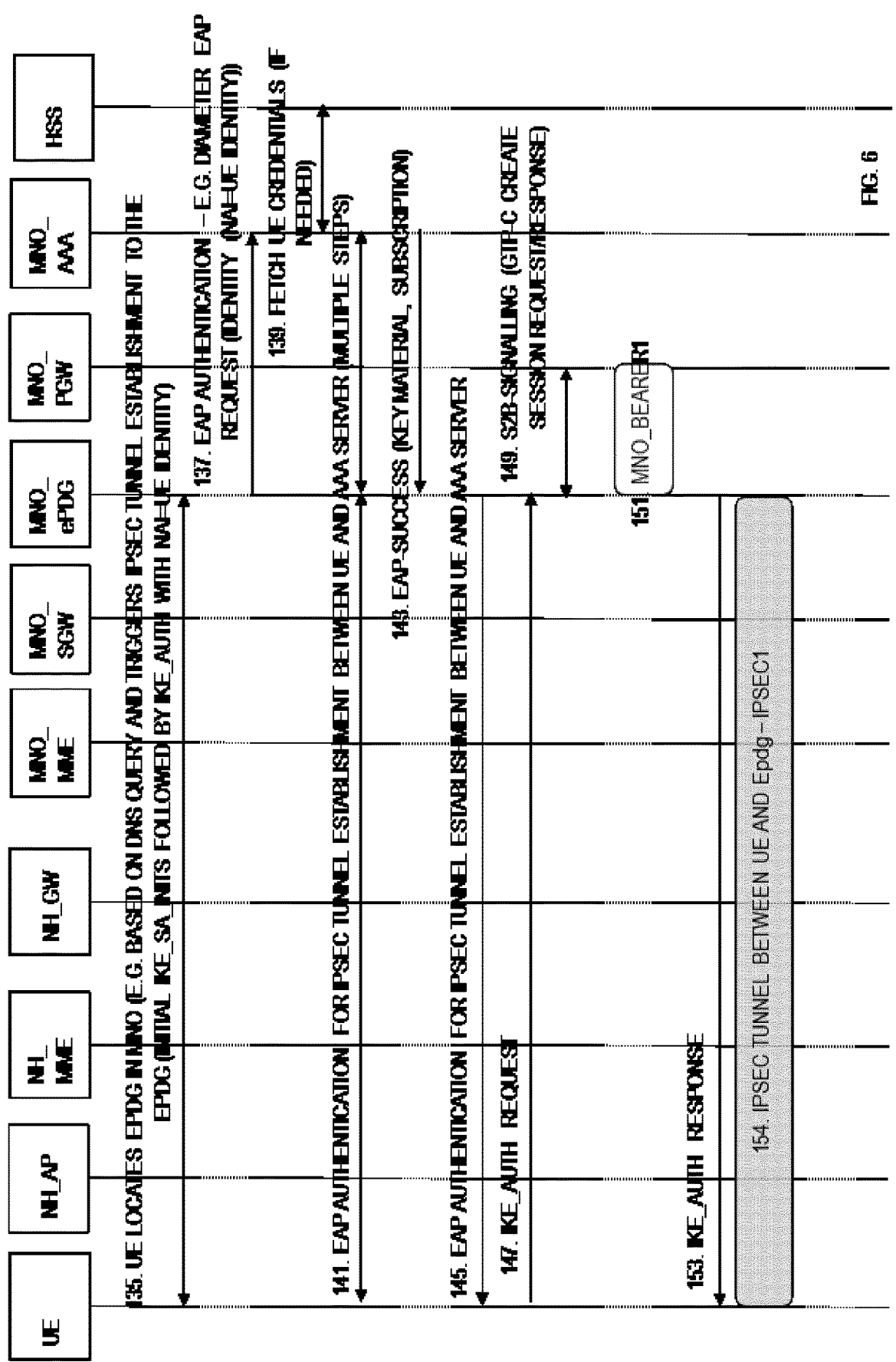

In FIG. 6, step 135, the UE locates ePDG in MNO (e.g. based on DNS query and triggers IPSEC tunnel establishment to the ePDG (initial IKE_SA_INITS followed by IKE_AUTH with NAI=UE identity).

IKE is a component of IPsec used for performing mutual authentication and establishing and maintaining Security Associations (SAs). It is defined in RFC5996. IKE performs mutual authentication between two parties and establishes an IKE security association (SA) that includes shared secret information that can be used to efficiently establish SAs for Encapsulating Security Payload (ESP, RFC4303) or Authentication Header (AH) and a set of cryptographic algorithms to be used by the SAs to protect the traffic that they carry.

IKE and IPsec are used for the non-3GPP untrusted access solution (3GPP TS 23.402 V. 13.4.0 (2015-12)). By using IKE, the UE and Evolved Packed Data Gateway (ePDG) can authenticate each other and establish an IPsec tunnel that can be used to transport data between 3GPP EPC and the UE in a secure manner (confidentiality and integrity protected).

The MNO_ePDG transmits 137 EAP authentication—e.g. DIAMETER EAP REQUEST (IDENTITY (NAI=UE IDENTITY)) to the MNO_AAA, which 139 fetches UE credentials (if not already in possession of the MNO_AAA).

The MNO_AAA communicates to the UE a 141 EAP authentication for IPSEC tunnel establishment signalling between UE and AAA server (multiple steps). Then the MNO_AAA signals 143 EAP-SUCCESS (key material, subscription) to the MNO-ePDG, which again sends a 145 EAP AUTHENTICATION signalling for IPSEC tunnel establishment between UE and AAA server (multiple steps).

The UE responds with 147 IKE_AUTH REQUEST to the MNO_ePDG. Then follows between MNO-ePDG and MNO_PGW 149 S2B-SIGNALLING (GTP-C CREATE SESSION REQUEST/RESPONSE), such that in step 151, MNO_BEARER1 established between MNO_PGW and MNO-ePDG.

NH_BEARER1 and MNO_BEARER1 can be considered as default bearers in the present embodiment.

Then follows from MNO_ePDG, a153 IKE_AUTH RESPONSE message.

Finally, in 154 an IPSEC tunnel between UE and ePDG—IPSEC1—is formed.

However, in order to provide differentiated services in the NH network, further steps are undertaken.

Figure 7:
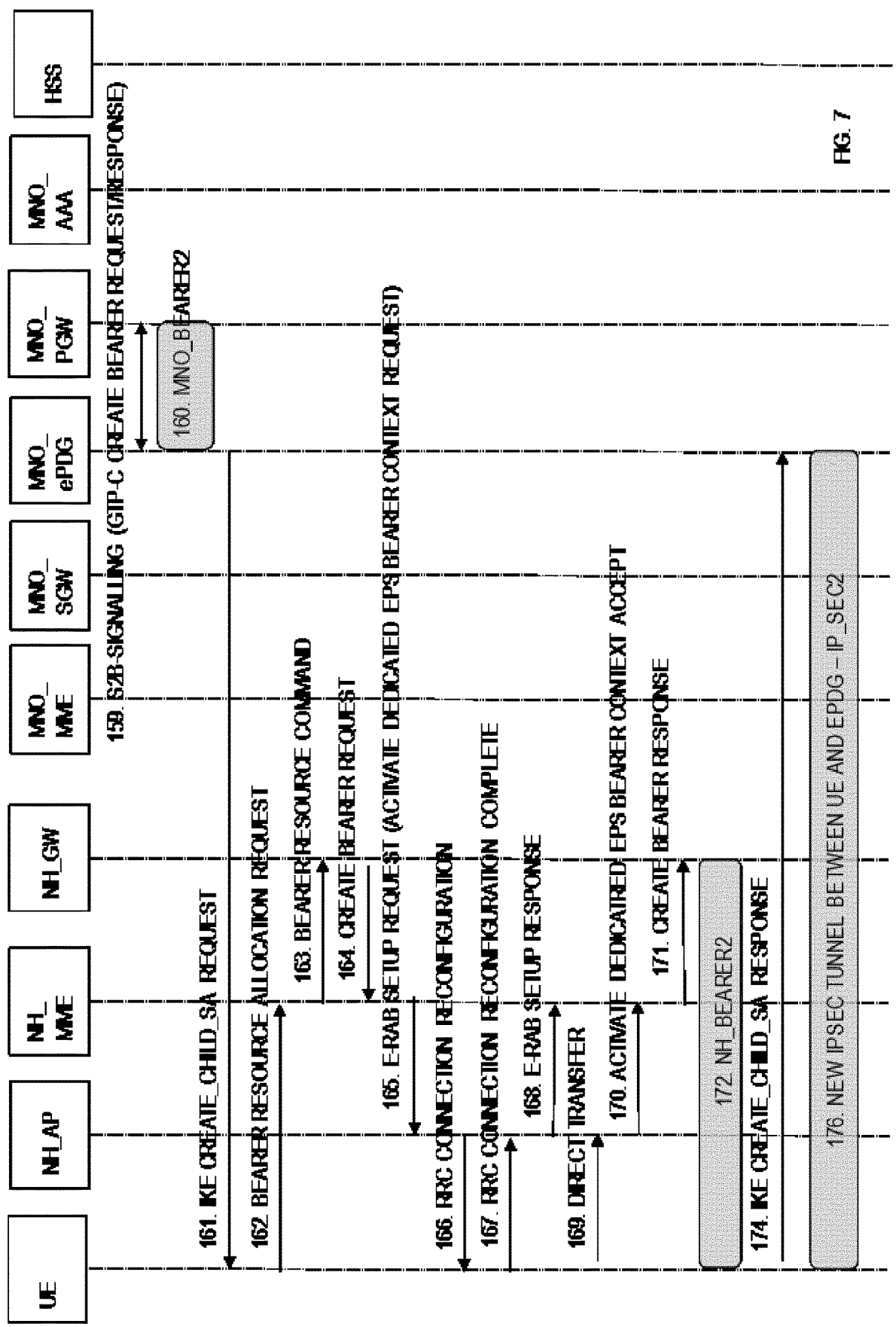

In FIG. 7, PCRF will, based on input from UE policies or based on input from an application (like IMS in case of VoLTE telephony), setup resources in MNO network. Also, the PGW might have static policies triggering the setup of resource in MNO network. This is done as in legacy procedures and will result in a dedicated bearer created between PGW and ePDG (Create Bearer Request/Response on S2b, 3GPP 23.402).

Hence, the MNO_ePDG communicates 159 a S2B-SIG-NALLING (GTP-C CREATE BEARER REQUEST/RESPONSE) for setting up 160 a second MNO bearer, MNO_BEARER2, between MNO_PGW and MNO_ePDG.

EPDG creates, according to an embodiment of the invention, a new child security association between ePDG and UE. There is already an IKE security association and this can be used to create a new IPsec tunnel (CREATE_CHILD_SA, RFC5996). Traffic selectors (RFC5996) are sent via IKE to UE with information on what traffic to send on the newly created IPsec tunnel. This could for example be the voice traffic for a call and it will be the same traffic that is also using the dedicated bearer between PGW and ePDG. The ePDG could also add other QoS parameters in the IKE signal sent to UE as for example data rate and QoS class (in addition to what is sent according to RFC5996). In legacy, the ePDG will not do any action toward the UE when dedicated bearer is created between PGW and ePDG.

Hence, the MNO-ePDG transmits 161 an IKE CREATE_CHILD_SA REQUEST to the UE.

When UE get the IKEv2 CREATE_CHILD_SA message from ePDG containing traffic selectors and potentially also other QoS parameters, it will initiate the setup of dedicated bearer in the NH network. In a LTE/LTE-U network this could be done with a Bearer Resource Allocation (3GPP TS 23.401 V. 13.4.0 (2015-09)) message. The UE requests a specific QoS demand (QCI) and optionally sends a GBR requirement for the new traffic flow. If it's accepted by the NH network based on certain local policy or user profile and provided that resources indeed are available, this procedure invokes a dedicated EPS bearer context activation procedure or an EPS bearer context modification procedure. The UE bearer resource allocation request will include a traffic flow aggregate that at least carry information on what downlink traffic the NH network should send on the dedicated bearer toward the UE. This will in normal case (but not limited to) be all traffic that is received on the newly created IPsec tunnel. This traffic can be identified by the Security Parameter Index in the ESP header (not encrypted).

In other words, the UE in turns transmits 162 BEARER RESOURCE ALLOCATION REQUEST to the NH_MME, which transmits a 163 BEARER RESOURCE COMMAND to the NH_GW.

The NH_GW responds with 164 CREATE BEARER REQUEST to the NH_GW which again issues a 165 E-RAB SETUP REQUEST (ACTIVATE DEDICATED EPS BEARER CONTEXT REQUEST) to the NH_AP.

The NH_AP transmits a 166 RRC CONNECTION RECONFIGURATION message to the UE, which responds with message 167 RRC CONNECTION RECONFIGURATION COMPLETE. The NH_AP in turn issues a message 168 E-RAB SETUP RESPONSE to the NH_MME.

The UE transmits a 169 DIRECT TRANSFER to the NH_AP and the NH_AP transmits a 170 ACTIVATE DEDICATED EPS BEARER CONTEXT ACCEPT to the NH_MME. The NH_MME transmits a message 171 CREATE BEARER RESPONSE to the NH_GW.

At this point, 172, a new bearer, NH_BEARER2, is set up between the NH_AP and the NH_GW.

The UE transmits a 174 IKE CREATE_CHILD_SA RESPONSE to the MNO_ePDG and a new IPSEC tunnel between UE and ePDG—IP_SEC2—is set up, 176. It is noted that this message could be sent earlier in the procedure.

Figure 1:
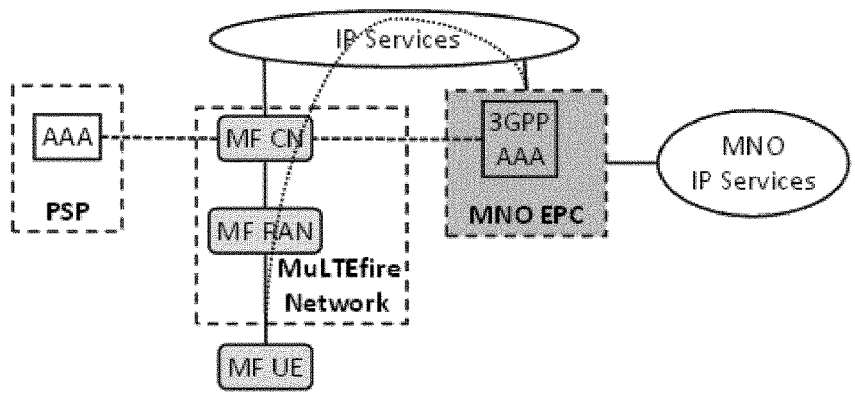
FIG. 1 shows a prior art Neutral Host, NH, deployment scenario, for an Evolved Packet Core, EPC, network.
Figure 2:
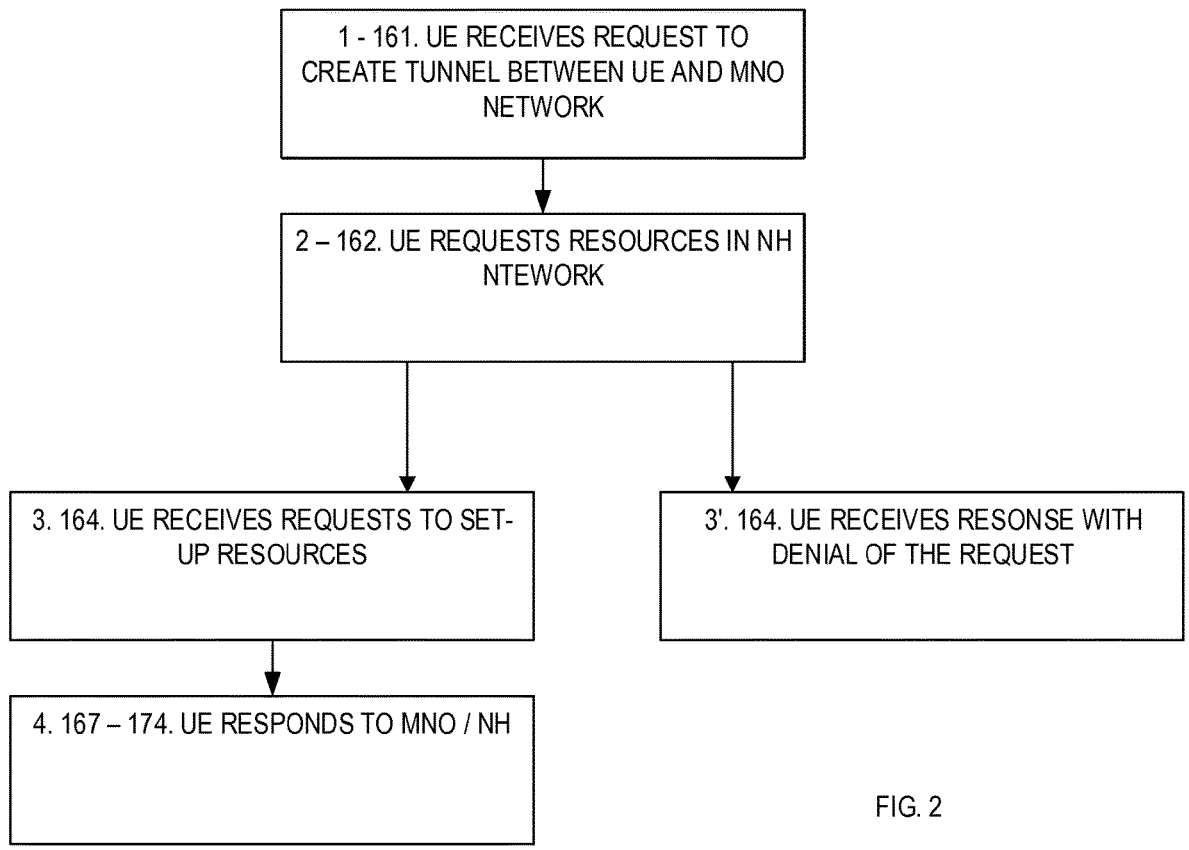
FIG. 2 shows a flow diagram pertaining to a user entity according to an embodiment of the invention.

In FIG. 2 some actions as seen from the perspective of the UE is indicated. In step 1—corresponding to step 161 above, the UE receives a request to create a tunnel between the UE and the MNO network.

In step 2—162—the UE requests resources in the NH network.

The UE may subsequently receive requests to set up resources 3—162, or the UE may receive a response from the NH with a denial of the request, 3'. If no denial is received, 3, the UE responds 4—167-174 to the MNO/NH.

Further Embodiments

Method for a Neutral Host, NH, network and a Mobile Network Operator, MNO, network, the MNO network comprising an access point (MNO_AP), such as an LTE eNodeB, a MME (MNO_MME), a Serving Gateway, (MNO_SGW), a MNO Packet Gateway (MNO_PGW) providing MNO IP services such as the Internet; the MNO network moreover comprises an Evolved Packed Data Gateway, ePDG, (MNO_ePDG), which may be used to provide Packet Data Connection, PDN, services to user entities (UE) of the NH network; the NH network comprising an access node (NH-AP), a MME (NH_MME) and a Gateway, (NH_GW); the NH gateway is connected to the ePDG for provides connectivity to the NH_PGW connecting further to MNO IP services such as the Internet;

the method comprising the steps the UE finding (105) a NH cell performing MNE selection;

setting up (132) a first NH bearer (NH_BEARER1) between the NH AP (NH_AP) and the NH GW (NH_GW);

setting up (151) a first MNO bearer (MNO_BEARER1) between the MNO ePDG (MNO_ePDG) and the MNO PGW (MNO_PGW);

setting up (154) a first IPsec tunnel between the UE and the MNO ePDG;

setting up (160) a second MNO bearer (MNO_BEARER2) between the MNO ePDG (MNO_ePDG) and the MNO PGW (MNO_PGW), setting up (172) a second NH bearer (NH_BEARER2) between the NH AP (NH_AP) and the NH GW (NH_GW), and setting up (176) a second IPsec tunnel between the UE and the MNO ePDG.

Embodiments relating to Bearer model and QoS (Quality of Service) Concepts

The same bearer model may be used as in LTE. In order to avoid EPC impacts, the same QoS parameters are used. The policy management of QoS may depend on network implementation. PCRF or some other policy management framework may or may not be used in the network.

For MNO anchored traffic (using the untrusted Non-3GPP Access solution) there is one bearer model between the UE and the MNO traffic and one bearer model between the UE and the NHN (Neutral Host Network). The MNO bearer model is described below under—MNO PDN connectivity service. The same bearer model is used for the NH network as in LTE. Further below under—Combination of MNO and NHN bearer model—it is specified how the MNO bearer model is combined with the NH network bearer model.

MNO PDN Connectivity Service

For untrusted non-3GPP access to the EPC the PDN connectivity service is provided by IPsec connectivity between the UE and the ePDG concatenated with S2b bearer(s) between the ePDG and the PGW.

Figure 7A:
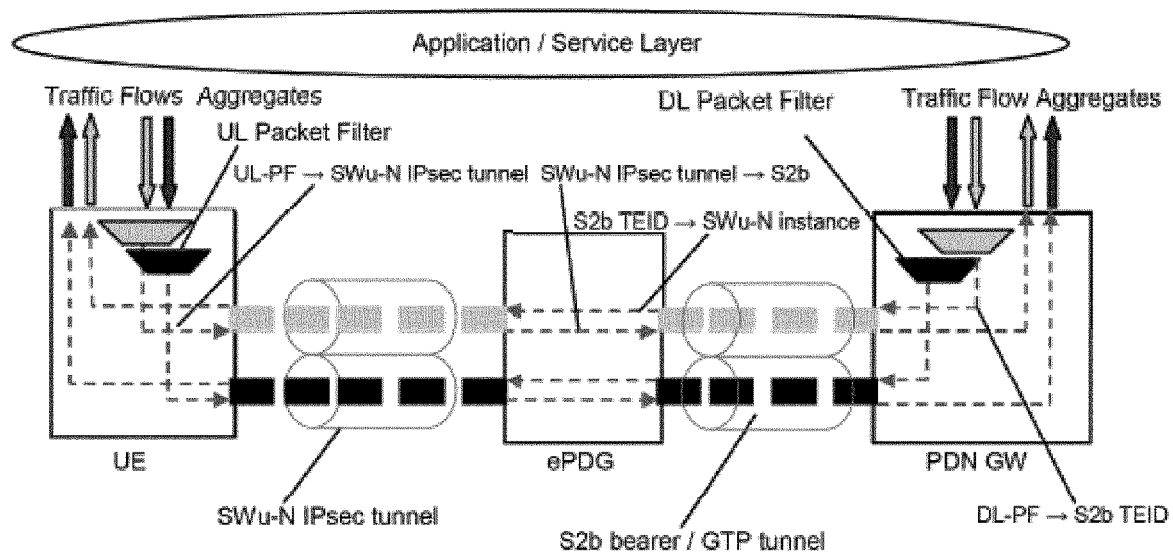
FIG. 7a-7e shows further embodiments of signalling diagrams.

As shown in FIG. 7a, showing two Unicast S2b bearers (GTP based S2b), the UE establishes a separate SWu instance (i.e. a separate IKEv2 SA) for each PDN connection. One IPsec tunnel is established for each bearer in the PDN connection.

One default S2b bearer, an IKE SA and a IPsec SA is established when the UE connects to a PDN, and that remains established throughout the lifetime of the PDN connection to provide the UE with always-on IP connectivity to that PDN. Additional dedicated S2b bearers may be established on S2b for the same PDN connection depending on operator policy. For each dedicated bearer on S2b, a corresponding IPsec tunnel is created. There is a one-to-one mapping between the S2b bearers and the IPsec tunnels. The PGW establishes dedicated S2b bearers on S2b for the same PDN connection based on PCC decisions as specified in TS 23.203.

The ePDG releases the SWu-N instance when the default S2b bearer of the associated PDN connection is released.

The EPS bearer is realized by the following elements:
A GTP tunnel on S2b transports the packets of an S2b bearer between the ePDG and a PDN GW;
An IPsec tunnel on SWu-N transports the packets of an SWu-N bearer between the UE and an ePDG;
The ePDG stores the mapping between IPsec tunnels and the corresponding S2b bearer;
The UE stores the mapping between uplink packet filters it receives from the PGW via ePDG and the corresponding IPsec tunnel;
The PDN GW stores the mapping between downlink packet filters and an S2b bearer.

The UE routes uplink packets to the different IPsec tunnels based on the traffic selectors (TSi/TSr) received when IPsec tunnel is created. The traffic selectors are derived by the ePDG from the TFTs (Traffic Flow Templates) when the bearer is setup and signalled to the UE as part of the creation of the IPsec tunnel. The ePDG forwards uplink packets from the IPsec tunnel to the corresponding S2b bearer. The ePDG forwards downlink packets from the S2b bearer to the corresponding IPsec tunnel.

The PDN GW routes downlink packets to the different bearers based on the downlink packet filters in in the TFTs assigned to the S2b bearers in the PDN connection, in the same way as the PDN GW does on GTPbased S5/S8 bearers (see TS 23.401 V. 13.4.0 (2015-09) clause 4.7.2.2).

Combination of MNO and NHN Bearer Model

Figure 7B:
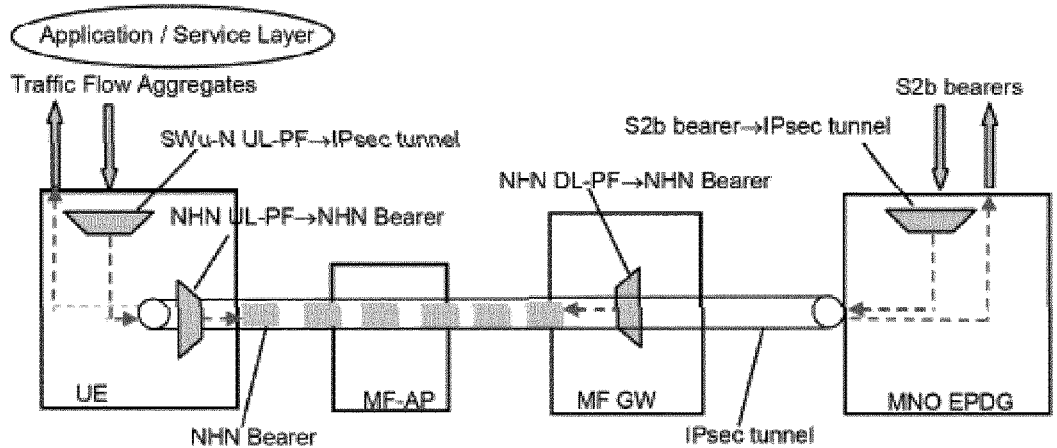

For each default and dedicated MNO bearer created, the UE have two options:
1. The UE can create a NH network dedicated bearer as shown in FIG. 7b. The NH network dedicated bearer will have TFTs specified by the IPsec tunnel SPI value resulting in that all uplink and downlink traffic for the IPsec tunnel will be using the dedicated bearer in NHN. The creation of the dedicated bearer in NH network is initiated when a new IPsec tunnel is created between UE and MNO ePDG. This is achieved by the UE sending a "UE requested bearer resource allocation" according to 3GPP TS 23.401 V. 13.4.0 (2015-09), clause 5.4.5.
2. The UE can use the NH network default bearer for the traffic that corresponds to the MNO dedicated bearer.

Further aspects relate to Procedures within MulteFire™ RAN—Embodiments relating to UE Attach In the SWa Authentication and Authorization Answer, the AAA can optionally provide a "NH NETWORK QoS Policy" to the NH-MME. The "NH network QoS Policy" contains information on if the UE is allowed to allocate resources in the NH network and a specification on what traffic that the UE can allocate resources for. For example, the MNO can provide a "NH network QoS Policy" that specifies that the UE is only allowed to create dedicated bearers for traffic to/from the MNO ePDG. The NH-MME use the "NH network QoS Policy" as input for admission control when the UE do a "UE requested bearer resource allocation". Local policies in the NH network can override the "NH network QoS Policy".

Dedicated S2b Bearer Activation

Figure 7C:
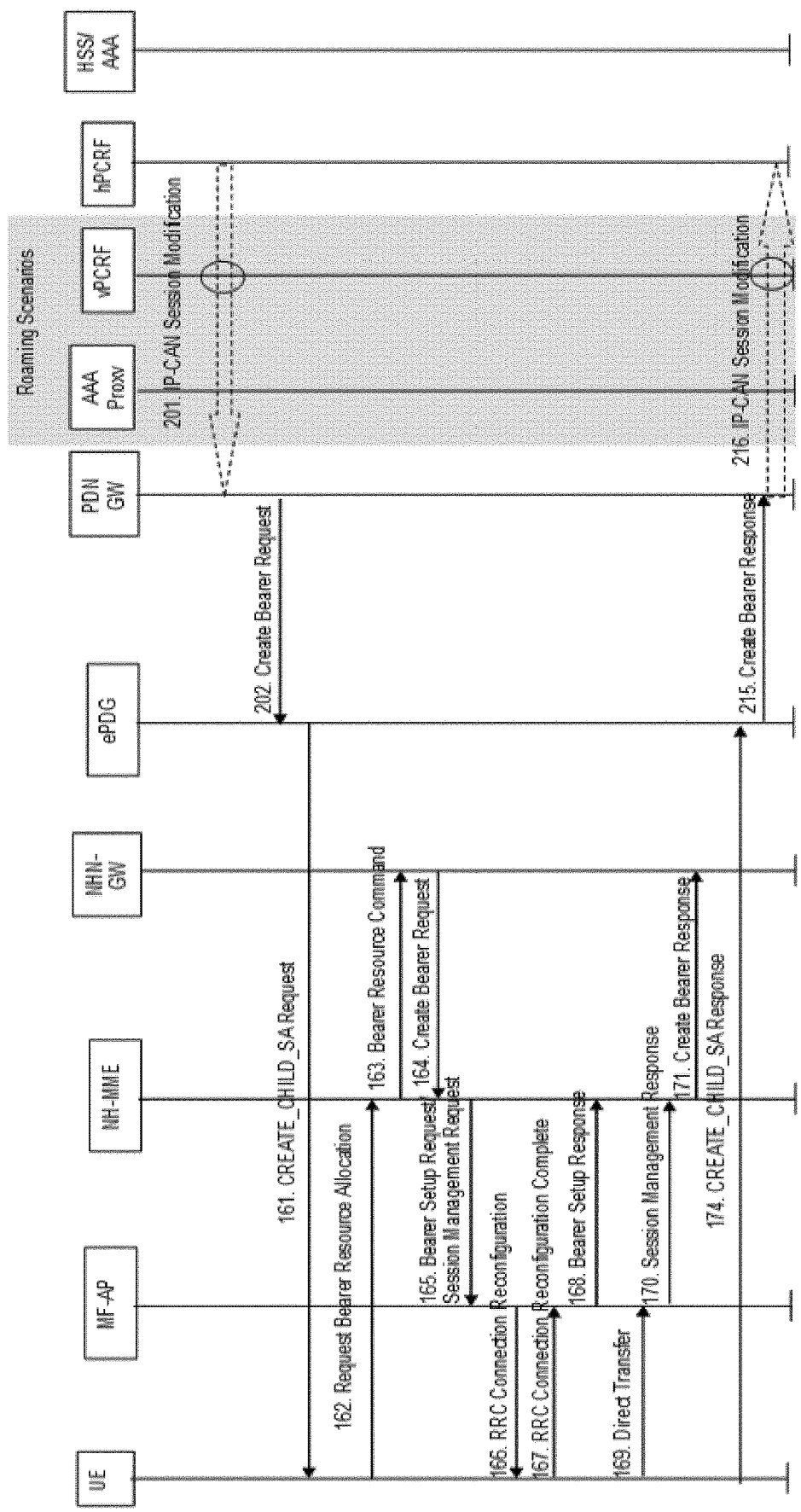

FIG. 7c shows a further embodiment for the complete call-flow for how a dedicated S2b bearer is created in MNO network, an IPsec tunnel between ePDG and UE is created and a NH network dedicated bearer is created.

201-202. These messages are sent as specified in 3GPP TS 23.402 V. 13.4.0 (2015-12), clause 7.10.

161. The ePDG maps the received TFT to a TSi and TSr and then it sends a CREATE_CHILD_SA request to the UE to create a new IPsec tunnel. See RFC5996.

162-171. Messages are sent as specified in 3GPP TS 23.401 V. 13.4.0 (2015-09), clause 5.4.5 with the following deviations/clarifications:

The TAD will indicate an "add" operation and the packet filters are derived from the TSi/TSr in the CREATE_CHILD_SA request.

The NH-MME can when receiving the Request Bearer Resource Modification message validate that the request is according to the UE's "NH network QoS Policy" that was received from MNO AAA when the UE attached to NH network.

174. The UE sends a CREATE_CHILD_SA response to the ePDG.

215-216. See 3GPP TS 23.402 V. 13.4.0 (2015-12), clause 7.10.

Figure 7D:
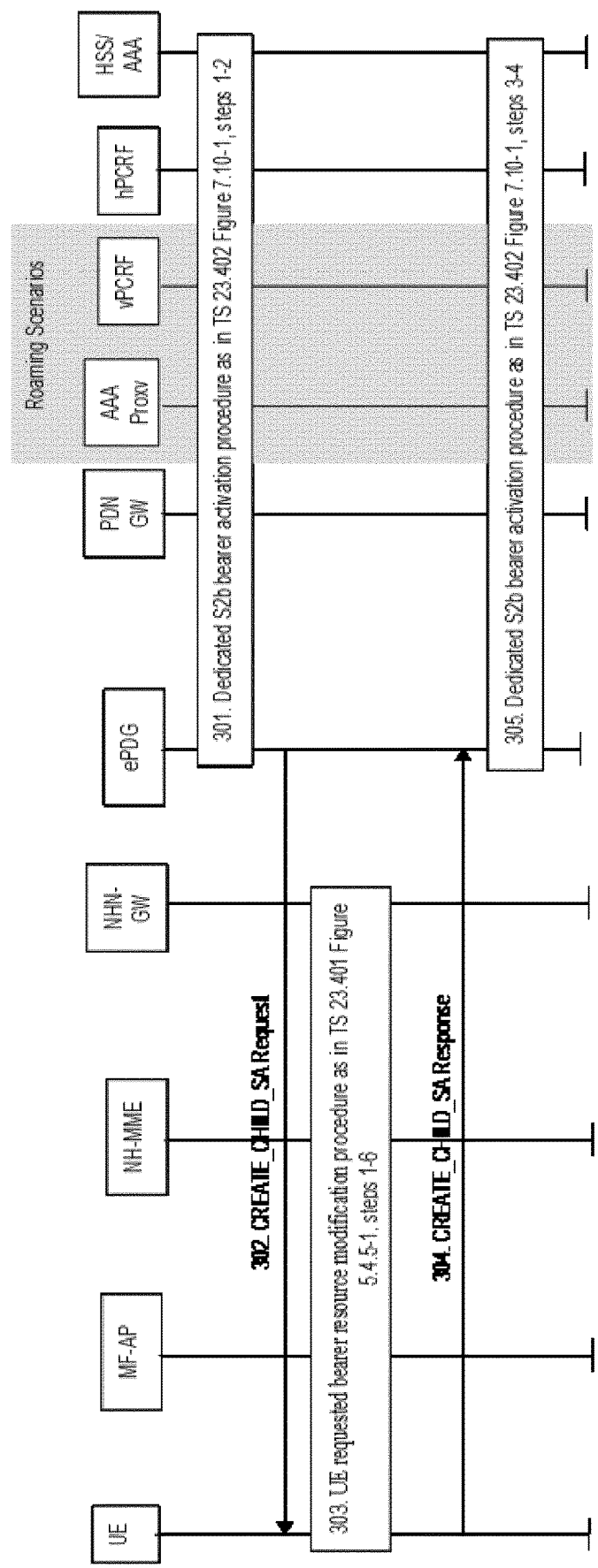

FIG. 7d shows a still further embodiment for the complete call-flow for how a dedicated S2b bearer is created in MNO network, an IPsec tunnel between ePDG and UE is created and a NH network dedicated bearer is created.

301. Step 1 is the same as 1-2 of 3GPP TS 23.402 V. 13.4.0 (2015-12), FIGS. 7.10-1.

302. The ePDG sends a CREATE_CHILD_SA request to the UE to create a new IPsec tunnel, see RFC5996. The ePDG include TFT for uplink direction using TFT IKEv2 notify payload (or similar information element such as a configuration payload) and Bearer QoS using QoS IKEv2 notify payload (or similar information element such as a configuration payload).

303. Step 3 is the same as step 1-6 of 3GPP TS 23.401 V. 13.4.0 (2015-09), FIG. 5.4.5-1 with the following clarifications:

NAS message Bearer Resource Allocation request will be used from UE.

TFT should be set to match the IPsec SPI in downlink and uplink directions for the new IPsec tunnel created.

The NH-MME can when receiving the NAS Bearer Resource Allocation request message validate that the request is according to the UE's "NH network QoS Policy" that was received from MNO AAA when the UE attached to NH network.

304. The UE sends a CREATE_CHILD_SA response to the ePDG.

305. Step 5 is the same as 3-4 of 3GPP TS 23.402 V. 13.4.0 (2015-12), FIGS. 7.10-1.

Figure 7E:
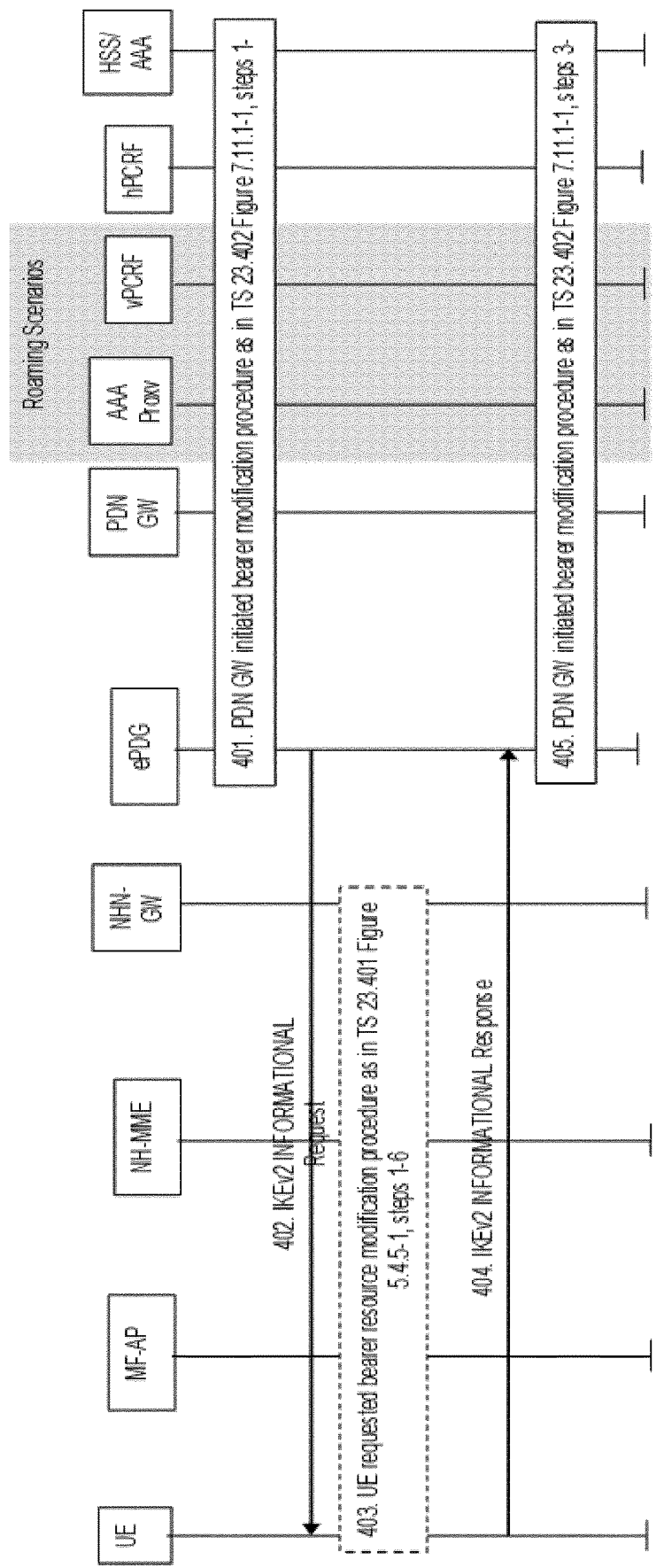

FIG. 7e shows an embodiment for a PDN GW initiated bearer modification procedure for GTP based S2b.

401. Step 1 is the same as 1-2 of 3GPP TS 23.402 V. 13.4.0 (2015-12), FIG. 7.11.1-1.

402. The ePDG sends an IKEv2 INFORMATIONAL request to the UE, see RFC5996. The ePDG can, depending on what parameters that are modified, include TFT for uplink direction using TFT IKEv2 notify payload (or similar information element such as a configuration payload) and Bearer QoS using QoS IKEv2 notify payload (or similar information element such as a configuration payload).

403. Step 3 is only needed if the dedicated bearer in the NH NETWORK needs to be updated and that is only when one or several of the EPS Bearer QoS parameters 001, GBR, MBR or ARP are modified. Step 3 is the same as step 1-6 of 3GPP TS 23.401 V. 13.4.0 (2015-09), FIG. 5.4.5-1 with the following clarification:

NAS message Bearer Resource Modification request will be used.

404. The UE sends an IKEv2 INFORMATIONAL response to the ePDG.

405. Step 5 is the same as 3-4 of 3GPP TS 23.402 V. 13.4.0 (2015-12), FIG. 7.11.1-1.

To sum up some of the methods explained above, there is provided:

A method for a NH, network, a Mobile Network Operator, MNO, network, and a User Entity, UE,
the MNO network comprising an access point, MNO_AP, such as an LTE eNodeB, a Mobility Management Entity, MME, MNO_MME, a Serving Gateway, MNO_SGW, a MNO Packet Gateway, PGW, MNO_PGW providing MNO Internet Protocol, IP, services such as Internet;
the Evolved Packed Data Gateway, wherein the ePDG, MNO_ePDG, may pro-vide Packet Data Connection, PDN, services to user entities UE of a NH network;
the NH network comprising an NH access node, NH-AP, communicating with the ePDG; the method comprising
  the UE connecting to the MNO network 101;
  the UE finding 105 a NH cell; and
  the UE engaging in setting up 132 a connection in the NH network between the UE and the NH-AP;
  the ePDG engaging 151 in setting up a first MNO bearer MNO_BEARER1 between the MNO ePDG MNO_ePDG and the MNO PGW MNO_PGW;
  the ePDG engaging in setting up 154 a first IPsec tunnel between the UE and the MNO ePDG;
  the ePDG engaging setting up 160 a second MNO bearer MNO_BEARER2 between the MNO ePDG, MNO_ePDG, and the MNO PGW, MNO_PGW, and
  the ePDG requesting setting up 1, 161 a second IPsec tunnel between the UE and the MNO ePDG, for providing differentiated services for the UE,
  the UE and the ePDG engaging in setting up 176 a second IPsec tunnel between the UE and the MNO ePDG, for providing differentiated services.

The UE is responding with a response message 4, 174 to the request 1, 161 for setting up of the second IPsec tunnel, in embodiments.

The request 1, 161 to create the second IPsec tunnel between the UE and the MNO network comprises at least one of Traffic Filter Templates, TFT, traffic selectors and QoS class.

The request 1, 161 to create the second IPsec tunnel between the UE and the MNO network is according to an embodiment an Internet Key Exchange, IKE, CREATE CHILD Service Association, SA, request message to create a second IPsec tunnel.

The request 1, 161 to create a second tunnel between the UE and the MNO network may be a CREATE CHILD Service Association, SA, request message and the response 174 may be a CREATE CHILD service association, SA, response message.

The UE, upon receiving the request 1, 161 to create the second IPsec tunnel 176 between the UE and the MNO network, may request 2, 162 resources in the NH network, leading to the setting up 172 of a second NH bearer NH_BEARER2, between the UE and the NH GW NH_GW.

The NH network is in embodiments of the invention a MulteFire™ network or a Long Term Evolution, LTE, network operating in unlicensed spectrum.

The first and second MNO-bearers 151, 160 can be S2b General Packet Radio Service Tunnelling Protocol, GTP, tunnels for transporting packets between the ePDG and a PDN GW;
the first and second 154, 176 may be IPsec tunnels transport packets on SWu-N bearers between the UE and the ePDG MNO_ePDG;
the ePDG MNO_ePDG may store a mapping between the first and second IPsec tunnels and the corresponding MNO bearers;
the UE may store a mapping between uplink packet filters the UE receives from the PGW via ePDG and the corresponding IPsec tunnel;
the PDN GW MNO_PGW may store the mapping between downlink packet filters and an MNO bearer.

There is moreover provided a method for a user entity, UE, in a Neutral Host, NH, network and a Mobile Network Operator, MNO, network, the MNO network comprising an access point MNO_AP, such as an LTE eNodeB, a Mobility Management Entity, MME, MNO_MME, a Serving Gateway, MNO_SGW, a MNO Packet Gateway MNO_PGW providing MNO Internet Protocol, IP, services such as the Internet;
the MNO network moreover comprises an Evolved Packed Data Gateway, ePDG, MNO_ePDG, which may be used to provide Packet Data Connection, PDN, services to user entities UE of the NH network;
the NH network comprising an access node NH-AP, a Mobility Management Entity, MME NH_MME and a Gateway, NH_GW;
the NH gateway being connected to the ePDG for providing connectivity to the NH_PGW connecting further to MNO IP services such as the Internet;
comprising
  the UE connecting to the MNO network 101;
  the UE finding 105 a NH cell and engaging in setting up 132 a connection in the NH network between the UE and the NH-AP; wherein the ePDG being adapted for engaging 151 in setting up a first MNO bearer MNO_BEARER1 between the MNO ePDG MNO_ePDG and the MNO PGW MNO_PGW;
  the UE engaging in setting up 154 a first IPsec tunnel between the UE and the MNO ePDG;
the ePDG being adapted for engaging setting up 160 a second MNO bearer MNO_BEARER2 between the MNO ePDG MNO_ePDG and the MNO PGW MNO_PGW, and upon the ePDG requesting setting up 1, 161 a second IPsec tunnel between the UE and the MNO ePDG, for providing differentiated services for the UE, the UE
  the UE responding with a response message 4, 174 to the request 1, 161 for setting up of the second IPsec tunnel; and
  the UE engaging in setting up 176 a second IPsec tunnel between the UE and the MNO ePDG, for providing differentiated services.

The request for setting up 1, 161 a second IPsec tunnel between the UE and the MNO ePDG may be a CREATE CHILD SA request; and the response message 4, 174 may be a CREATE CHILD SA response.

There is provided a method for an Evolved Packed Data Gateway, ePDG, MNO_ePDG, in a Mobile Network Operator, MNO, network, the MNO network comprising an access point MNO_AP, such as an LTE eNodeB, a Mobility Management Entity, MME, MNO_MME, a Serving Gateway, MNO_SGW, a MNO Packet Gateway, PGW, MNO_PGW providing MNO Internet Protocol, IP, services such as Internet;
the Evolved Packed Data Gateway, wherein the ePDG, MNO_ePDG may provide Packet Data Connection, PDN, services to user entities UE of a NH network;
the NH network comprising an NH access node, NH-AP, communicating with the ePDG; wherein
a UE is adapted for connecting to the MNO network 101;
the UE being adapted for finding 105 a NH cell and engaging in setting up 132 a connection in the NH network between the UE and the NH-AP;
the method comprising
  the ePDG engaging 151 in setting up a first MNO bearer, MNO_BEARER1, between the MNO ePDG MNO_ePDG and the MNO PGW MNO_PGW;
  the ePDG engaging in setting up 154 a first IPsec tunnel between the UE and the MNO ePDG;
  the ePDG engaging setting up 160 a second MNO bearer, MNO_BEARER2, between the MNO ePDG MNO_ePDG and the MNO PGW MNO_PGW, and
  the ePDG requesting setting up 1, 161 a second IPsec tunnel between the UE and the MNO ePDG, for providing differentiated services for the UE.

The request 1, 161 to create the second IPsec tunnel between the UE and the MNO network comprises at least one of Traffic Filter Templates, TFT, traffic selectors and QoS class.

The request 1, 161 to create the second IPsec tunnel between the UE and the MNO network is an Internet Key Exchange, IKE, CREATE CHILD Service Association, SA, request message.

The CREATE_CHILD_SA request message may advantageously comprise QoS class and Traffic Filter Templates, TFT. A TFT for uplink direction may be using a TFT IKEv2 notify payload or an information element such as a configuration payload and a Bearer QoS is using QoS IKEv2 notify payload or an information element such as a configuration payload.

The ePDG may moreover be
  engaging 401 in a PGW initiated bearer modification procedure involving receiving an Update Bearer Request from the PDN Gateway MNO_PGW, comprising at least one of QoS class, traffic selectors and Traffic Filter Templates, TFT,
  transmitting 402 an IKEv2 INFORMATIONAL request to the UE, comprising one of a Traffic Filter Template, TFT, for uplink direction and Bearer QoS,
and upon receiving 404, an IKEv2 INFORMATIONAL response from the UE,
  continuing engaging 405 in the PGW initiated bearer modification procedure involving issuing an Update Bearer Response toward the PDN gateway MNO_PGW, thus completing the bearer modification procedure for the UE.

The IKEv2 INFORMATIONAL request to the UE may include one of a Traffic Filter Template, TFT, for uplink direction by using TFT IKEv2 notify payload or an information element such as a configuration payload and the Bearer QoS by using QoS IKEv2 notify payload or an information element such as a configuration payload.

The NH network may moreover comprise a Mobility Management Entity, MME NH_MME and a Gateway, NH_GW.

The connection between the UE and the NH-AP may further involve a first NH bearer NH_BEARER1 between the UE and the NH-Gateway, and it is further provided that a further connection between the UE and the NH-AP is being established that involves a second NH bearer, NH_BEARER2, between the UE and the NH-Gateway.

A program or computer program product implementing any of method steps/activities according to any of above have been provided.

Figure 8:
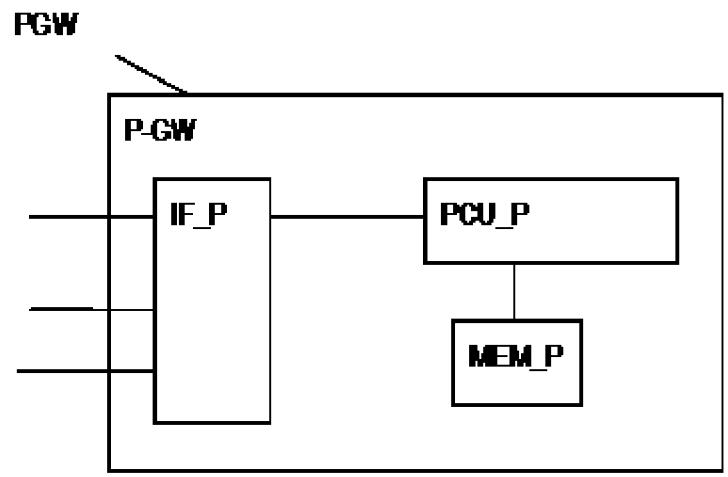
FIG. 8-10 show various entities according to particular embodiments of the invention.
Figure 8:
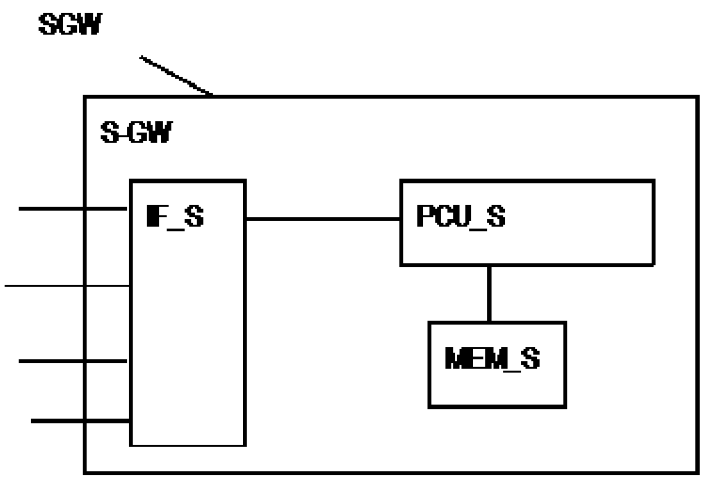
Figure 8:
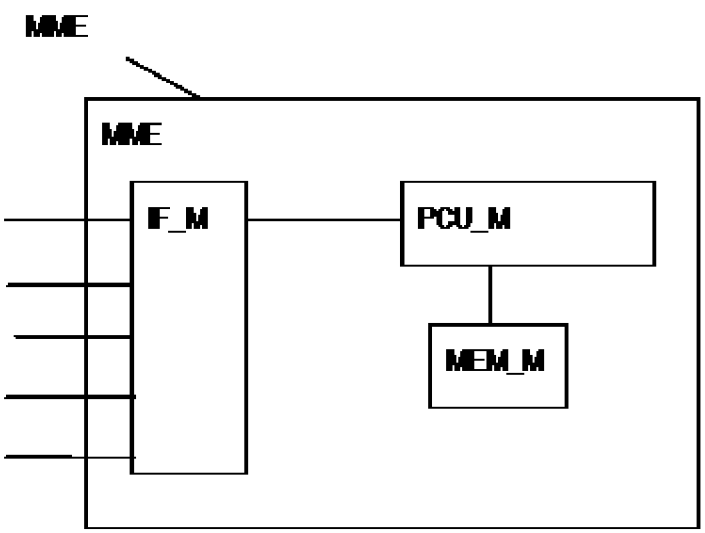

In FIG. 8 there is shown a PGW according to certain embodiments of the invention comprising an interface, IF_P a processor PCU-P and a memory, MEM-P. The processor is adapted to undertake instructions corresponding to those explained above.

There is moreover shown a SGW according to certain embodiments of the invention comprising an interface, IF_S a processor PCU-S and a memory, MEM-S. The processor is adapted to undertake instructions corresponding to those explained above.

Also shown is a MME according to certain embodiments of the invention comprising an interface, IF_M a processor PCU-M and a memory, MEM-M. The processor is adapted to undertake instructions corresponding to those explained above.

Figure 9:
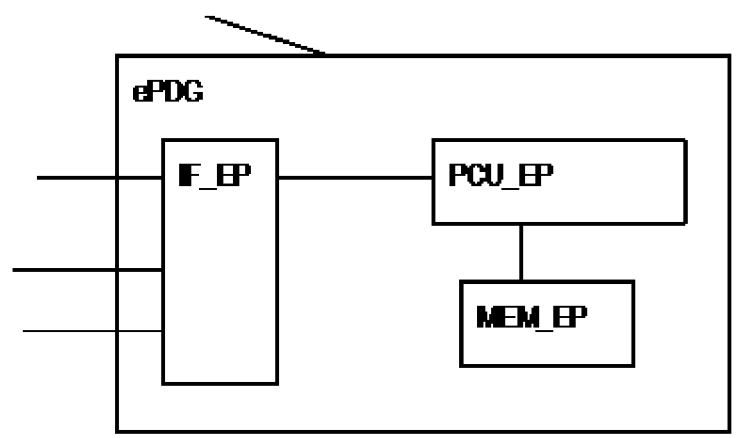
Figure 9:
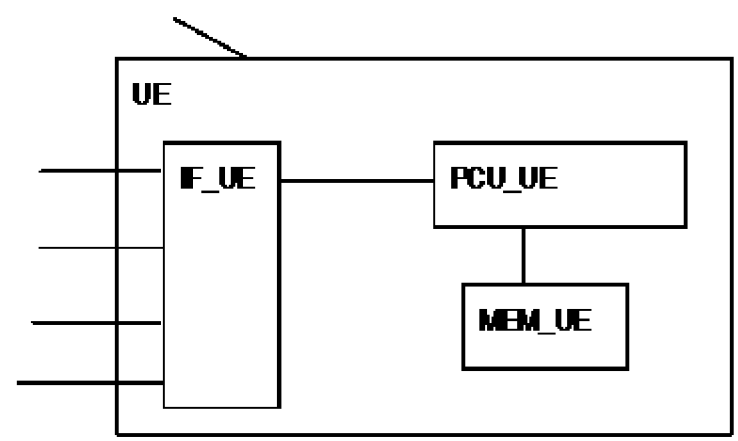
Figure 9:
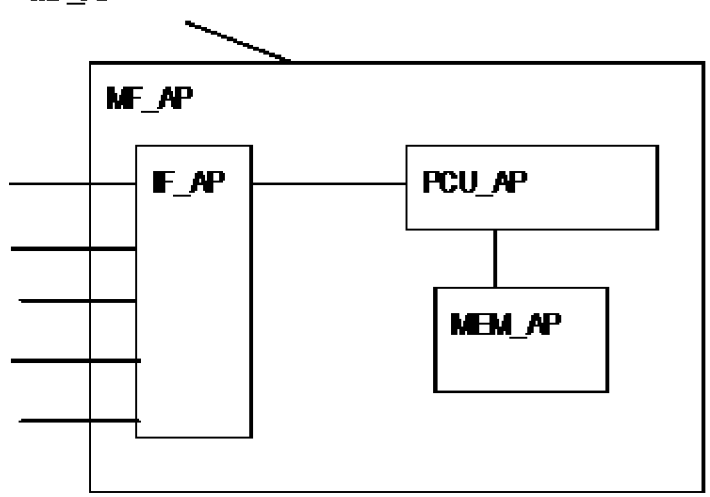

In FIG. 9 is shown an ePDG according to certain embodiments of the invention comprising an interface, IF_EP a processor PCU-EP and a memory, MEM-EP. The processor is adapted to undertake instructions corresponding to those explained above.

Also shown is a UE according to certain embodiments of the invention comprising an interface, IF_UE a processor PCU-U and a memory, MEM-UE. The processor is adapted to undertake instructions corresponding to those explained above.

Also shown is AP according to certain embodiments of the invention comprising an interface, IF_AP a processor PCU-AP and a memory, MEM-AP. The processor is adapted to undertake instructions corresponding to those explained above.

Figure 10:
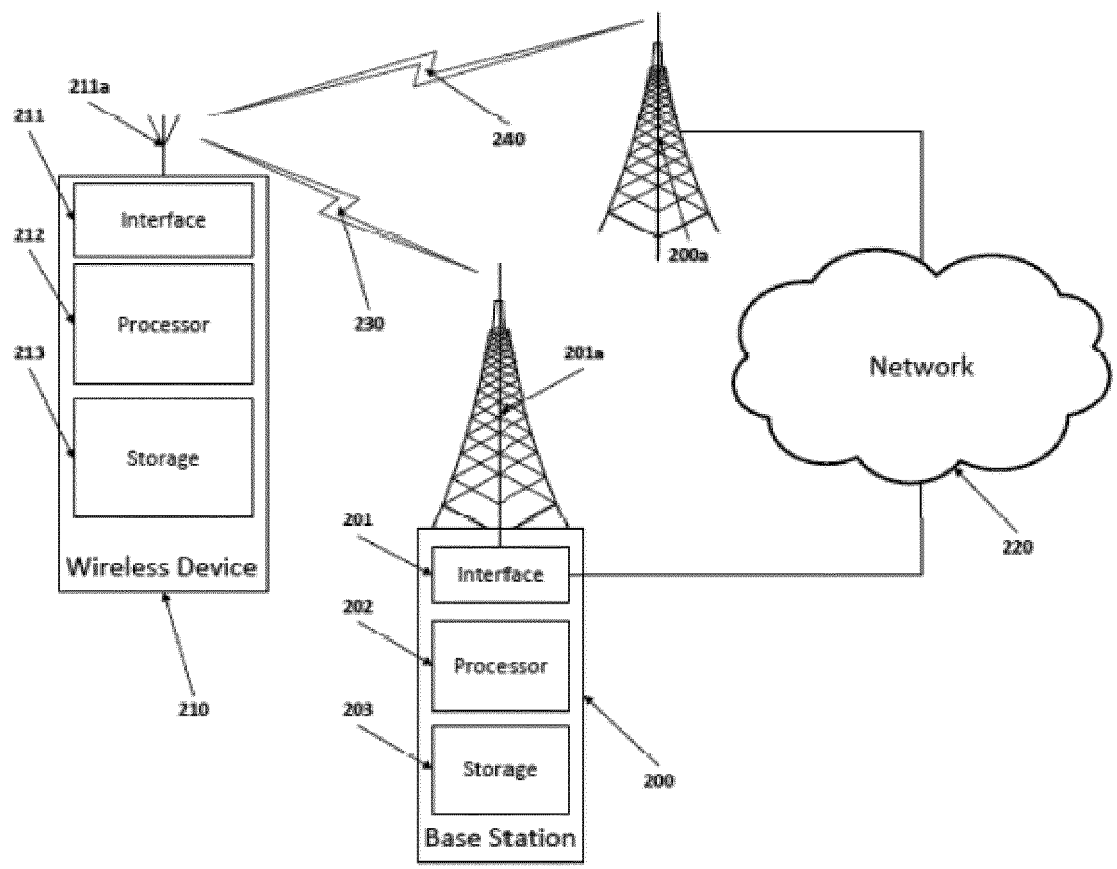

FIG. 10 illustrates a wireless network comprising a more detailed view of network node 200 and wireless device (WD) 210, in accordance with a particular embodiment. For simplicity, FIG. 2 only depicts network 220, network nodes 200 and 200a, and WD 210. Network node 200 comprises processor 202, storage 203, interface 201, and antenna 201a. Similarly, WD 210 comprises processor 212, storage 213, interface 211 and antenna 211a. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

Network 220 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Network node 200 comprises processor 202, storage 203, interface 201, and antenna 201a. These components are depicted as single boxes located within a single larger box. In practice however, a network node may comprise multiple different physical components that make up a single illustrated component (e.g., interface 201 may comprise terminals for coupling wires for a wired connection and a radio transceiver for a wireless connection). As another example, network node 200 may be a virtual network node in which multiple different physically separate components interact to provide the functionality of network node 200 (e.g., processor 202 may comprise three separate processors located in three separate enclosures, where each processor is responsible for a different function for a particular instance of network node 200). Similarly, network node 200 may be composed of multiple physically separate components (e.g., a NodeB component and a RNC component, a BTS component and a BSC component, etc.), which may each have their own respective processor, storage, and interface components. In certain scenarios in which network node 200 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 200 may be configured to support multiple radio access technologies (RATs). In such embodiments, some components may be duplicated (e.g., separate storage 203 for the different RATs) and some components may be reused (e.g., the same antenna 201a may be shared by the RATs).

Processor 202 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 200 components, such as storage 203, network node 200 functionality. For example, processor 202 may execute instructions stored in storage 203. Such functionality may include providing various wireless features discussed herein to a wireless device, such as WD 210, including any of the features or benefits disclosed herein.

Storage 203 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 203 may store any suitable instructions, data or information, including software and encoded logic, utilized by network node 200. Storage 203 may be used to store any calculations made by processor 202 and/or any data received via interface 201.

Network node 200 also comprises interface 201 which may be used in the wired or wireless communication of signalling and/or data between network node 200, network 220, and/or WD 210. For example, interface 201 may perform any formatting, coding, or translating that may be needed to allow network node 200 to send and receive data from network 220 over a wired connection. Interface 201 may also include a radio transmitter and/or receiver that may be coupled to or a part of antenna 201a. The radio may receive digital data that is to be sent out to other network nodes or WDs via a wireless connection. The radio may convert the digital data into a radio signal having the appropriate channel and bandwidth parameters. The radio signal may then be transmitted via antenna 201a to the appropriate recipient (e.g., WD 210).

Antenna 201a may be any type of antenna capable of transmitting and receiving data and/or signals wirelessly. In some embodiments, antenna 201a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

WD 210 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 200 and/or other WDs. WD 210 comprises processor 212, storage 213, interface 211, and antenna 211a. Like network node 200, the components of WD 210 are depicted as single boxes located within a single larger box, however in practice a wireless device may comprises multiple different physical components that make up a single illustrated component (e.g., storage 213 may comprise multiple discrete microchips, each microchip representing a portion of the total storage capacity).

Processor 212 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 210 components, such as storage 213, WD 210 functionality. Such functionality may include providing various wireless features discussed herein, including any of the features or benefits disclosed herein.

Storage 213 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 213 may store any suitable data, instructions, or information, including software and encoded logic, utilized by WD 210. Storage 213 may be used to store any calculations made by processor 212 and/or any data received via interface 211.

Interface 211 may be used in the wireless communication of signalling and/or data between WD 210 and network node 200. For example, interface 211 may perform any formatting, coding, or translating that may be needed to allow WD 210 to send and receive data from network node 200 over a wireless connection.

Interface 211 may also include a radio transmitter and/or receiver that may be coupled to or a part of antenna 211a. The radio may receive digital data that is to be sent out to network node 201 via a wireless connection. The radio may convert the digital data into a radio signal having the appropriate channel and bandwidth parameters. The radio signal may then be transmitted via antenna 211a to network node 200.

Antenna 211a may be any type of antenna capable of transmitting and receiving data and/or signals wirelessly. In some embodiments, antenna 211a may comprise one or more omni-directional, sector or panel antennas operable to transmit/receive radio signals between 2 GHz and 66 GHz. For simplicity, antenna 211a may be considered a part of interface 211 to the extent that a wireless signal is being used.

Any steps described herein are merely illustrative of certain embodiments. It is not required that all embodiments incorporate all the steps disclosed nor that the steps be performed in the exact order depicted or described herein. Furthermore, some embodiments may include steps not illustrated or described herein, including steps inherent to one or more of the steps disclosed herein.

Any appropriate steps, methods, or functions may be performed through a computer program product that may, for example, be executed by the components and equipment illustrated in the figure above. For example, storage 203 may comprise computer readable means on which a computer program can be stored. The computer program may include instructions which cause processor 202 (and any operatively coupled entities and devices, such as interface 201 and storage 203) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors 212 and/or 202, possibly in cooperation with storage 213 and/or 203. Processors 212 and/or 202 and storage 213 and/or 203 may thus be arranged to allow processors 212 and/or 202 to fetch instructions from storage 213 and/or 203 and execute the fetched instructions to allow the respective functional module to perform any steps or functions disclosed herein.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

To sum up some of the apparatuses explained above, there is provided:

A user entity, UE, in a Neutral Host, NH, network and a Mobile Network Operator, MNO, network, the MNO network comprising an access point, MNO_AP, such as an LTE eNodeB, a Mobility Management Entity,
MME, MNO_MME, a Serving Gateway, MNO_SGW, a MNO Packet Gateway, MNO_PGW, providing MNO Internet Protocol, IP, services such as the Internet;
the MNO network moreover comprising an Evolved Packed Data Gateway, ePDG, MNO_ePDG, which may be used to provide Packet Data Connection, PDN, services to user entities UE of the NH network; the NH network comprising an access node, NH-AP, NH_AP, a Mobility Management Entity, MME, NH_MME, and a Gateway, NH_GW;
the NH gateway being connected to the ePDG for providing connectivity to the NH_PGW connecting further to MNO IP services such as the Internet;
the UE comprising an interface IF_UE; a processor PCU-U and a memory MEM-UE, the UE being adapted for connecting to the MNO network 101;
finding 105 a NH cell and engaging in setting up 132 a connection in the NH network between the UE and the NH-AP;
wherein the ePDG being adapted for engaging 151 in setting up a first MNO bearer, MNO_BEARER1, between the MNO ePDG, MNO_ePDG, and the MNO PGW, MNO_PGW;
the UE engaging in setting up 154 a first IPsec tunnel between the UE and the MNO ePDG;
the ePDG being adapted for engaging setting up 160 a second MNO bearer, MNO_BEARER2, between the MNO ePDG, MNO_ePDG, and the MNO PGW MNO_PGW, and upon the ePDG requesting setting up 1, 161 a second IPsec tunnel between the UE and the MNO ePDG, for providing differentiated services for the UE,
the UE being adapted for
responding with a response message 4, 174 to the request 1, 161 for setting up of the second IPsec tunnel; and
the UE engaging in setting up 176 a second IPsec tunnel between the UE and the MNO ePDG, for providing differentiated services.

The request for setting up 1, 161 a second IPsec tunnel between the UE and the MNO ePDG being a CREATE CHILD SA request; the response message 174 being a CREATE CHILD SA response—according to embodiments of the invention.

There is provided an Evolved Packed Data Gateway, ePDG, MNO_ePDG, in a Mobile Network Operator, MNO, network, the MNO network comprising an access point MNO_AP, such as an LTE eNodeB, a Mobility Management Entity, MME, MNO_MME, a Serving Gateway, MNO_SGW, a MNO Packet Gateway, PGW, MNO_PGW providing MNO Internet Protocol, IP, services such as Internet;
the Evolved Packed Data Gateway, wherein the ePDG, MNO_ePDG may pro-vide Packet Data Connection, PDN, services to user entities UE of a NH network;
the NH network comprising an NH access node, NH-AP, communicating with the ePDG; wherein a UE is adapted for connecting to the MNO network 101;
the UE being adapted for finding 105 a NH cell and engaging in setting up 132 a connection in the NH network between the UE and the NH-AP;
the ePDG comprising an interface, IF_EP a processor PCU-EP and a memory, MEM-EP, adapted to engage 151 in setting up a first MNO bearer MNO_BEARER1 between the MNO ePDG MNO_ePDG and the MNO PGW MNO_PGW;

engage in setting up 154 a first IPsec tunnel between the UE and the MNO ePDG;
engage in setting up 160 a second MNO bearer, MNO_BEARER2, between the MNO ePDG MNO_ePDG and the MNO PGW MNO_PGW, and
requesting setting up 1, 161 a second IPsec tunnel between the UE and the MNO ePDG, for providing differentiated services for the UE.

The request 1, 161 to create the second IPsec tunnel between the UE and the MNO network may comprise at least one of Traffic Filter Templates, TFT, traffic selectors and QoS class.

The request 1, 161 to create the second IPsec tunnel between the UE and the MNO network is in embodiments an Internet Key Exchange, IKE, CREATE CHILD Service Association, SA, request message.

The invention claimed is:

1. Method for a Neutral Host (NH) network, a Mobile Network Operator (MNO) network, and a User Entity (UE), the MNO network comprising an access point (MNO_AP), a Mobility Management Entity (MNO_MME), a Serving Gateway (MNO_SGW), a MNO Packet Gateway (MNO_PGW) providing MNO Internet Protocol (IP) services;
   an Evolved Packed Data Gateway (MNO_ePDG), wherein the MNO_ePDG provides Packet Data Connection (PDN) services to user entities (UE) of the NH network;
   the NH network comprising an NH access node (NH-AP) communicating with the MNO_ePDG; the method comprising:
   the UE connecting to the MNO network;
   the UE finding a NH cell;
   the UE engaging in setting up a connection in the NH network between the UE and the NH-AP;
   establishing a first NH bearer (NH_BEARER1) between the UE and an NH Gateway (NH_GW);
   the MNO_ePDG engaging in setting up a first MNO bearer (MNO_BEARER1) between the MNO_ePDG and the MNO_PGW;
   the MNO_ePDG engaging in setting up a first IPsec tunnel between the UE and the MNO_ePDG;
   the MNO_ePDG engaging setting up a second MNO bearer (MNO_BEARER2) between the MNO_ePDG and the MNO_PGW;
   the MNO_ePDG requesting setting up a second IPsec tunnel between the UE and the MNO_ePDG for providing differentiated services for the UE;
   receiving a request, by the UE, to create the second IPsec tunnel between the UE and the MNO network;
   requesting, by the UE, resources in the NH network for setting up a second NH bearer (NH_BEARER2) between the UE and the NH_GW in response to the UE receiving the request to create the second IPsec tunnel; and
   the UE and the MNO_ePDG engaging in setting up the second IPsec tunnel between the UE and the MNO_ePDG for providing the differentiated services.

2. Method according to claim 1, wherein the request to create the second IPsec tunnel between the UE and the MNO network comprises at least one of Traffic Filter Templates (TFT) traffic selectors and Quality of Service (QoS) class.

3. Method according to claim 1, wherein the request to create the second IPsec tunnel between the UE and the MNO network is an Internet Key Exchange (IKE) CREATE CHILD Service Association (SA) request message to create the second IPsec tunnel.

4. Method according to claim 1, wherein the request to create the second IPsec tunnel between the UE and the MNO network is a CREATE CHILD Service Association (SA) request message and wherein the UE generates a bearer resource allocation request comprising a traffic flow aggregate that at least carries information on what downlink traffic the NH network should send on a dedicated bearer to the UE.

5. Method according to claim 1 wherein the NH network is a MulteFire™ network or a Long Term Evolution (LTE) network operating in unlicensed spectrum.

6. Method according to claim 3, wherein
   the first and second MNO-bearers are S2b General Packet Radio Service Tunnelling Protocol (GTP) tunnels for transporting packets between the MNO_ePDG and a PDN GW;
   the first and second IPsec tunnels transport packets on SWu-N bearers between the UE and the MNO_ePDG;
   the MNO_ePDG stores a mapping between the first and second IPsec tunnels and the corresponding MNO bearers;
   the UE stores a mapping between uplink packet filters the UE receives from the MNO_PGW via MNO_ePDG and the corresponding IPsec tunnel; and
   the MNO_PGW stores the mapping between downlink packet filters and an MNO bearer.

7. Method for a user entity (UE) in a Neutral Host NH network and a Mobile Network Operator (MNO) network, the MNO network comprising an access point (MNO_AP), a Mobility Management Entity (MNO_MME), a Serving Gateway (MNO_SGW), a MNO Packet Gateway (MNO_PGW) providing MNO Internet Protocol (MNO_IP) services;
   the MNO network moreover comprising an Evolved Packed Data Gateway (MNO_ePDG) used to provide Packet Data Connection (PDN) services to user entities (UE) of the NH network;
   the NH network comprising an NH access node (NH-AP), a Mobility Management Entity (NH_MME) and a Gateway (NH_GW);
   the NH_GW being connected to the MNO_ePDG for providing connectivity to the NH_GW and connecting further to the MNO IP services;
   the method comprising:
   the UE connecting to the MNO network;
   the UE finding a NH cell and engaging in setting up a connection in the NH network between the UE and the NH-AP;
   establishing a first NH bearer (NH_BEARER1) between the UE and the NH Gateway (NH_GW);
   wherein
   the MNO_ePDG being adapted for engaging in setting up a first MNO bearer (MNO_BEARER1) between the MNO_ePDG and the MNO_PGW;
   the UE engaging in setting up a first IPsec tunnel between the UE and the MNO_ePDG;
   the MNO_ePDG being adapted for engaging setting up a second MNO bearer (MNO_BEARER2) between the MNO_ePDG and the MNO_PGW;
   upon the MNO_ePDG requesting setting up a second IPsec tunnel between the UE and the MNO_ePDG for providing differentiated services for the UE,
   receiving a request, by the UE, to create the second IPsec tunnel between the UE and the MNO network;
   requesting, by the UE, resources in the NH network for setting up a second NH bearer (NH_BEARER2)

between the UE and the NH_GW in response to the UE receiving the request to create the second IPsec tunnel; and the UE engaging in setting up the second IPsec tunnel between the UE and the MNO ePDG for providing the differentiated services.

8. Method according to claim 7, wherein
the request for setting up the second IPsec tunnel between the UE and the MNO_ePDG is a CREATE CHILD SA request; and
wherein the UE generates a bearer resource allocation request comprising a traffic flow aggregate that at least carries information on what downlink traffic the NH network should send on a dedicated bearer to the UE.

9. Method for an Evolved Packed Data Gateway (MNO_ePDG), in a Mobile Network Operator (MNO) network, the MNO network comprising an access point (MNO_AP) a Mobility Management Entity (MNO_MME), a Serving Gateway (MNO_SGW), a MNO Packet Gateway (MNO_PGW) providing MNO Internet Protocol (IP) services;
the Evolved Packed Data Gateway (MNO_ePDG) provides Packet Data Connection (PDN) services to user entities (UE) of a Neutral Host (NH) network;
the NH network comprising an NH access node (NH-AP) communicating with the MNO_ePDG; wherein
a UE is adapted for connecting to the MNO network;
the UE being adapted for finding a NH cell and engaging in setting up a connection in the NH network between the UE and the NH-AP, wherein a first NH bearer (NH_BEARER1) is established between the UE and an NH Gateway (NH_GW);
the method comprising:
the MNO_ePDG engaging in setting up a first MNO bearer (MNO_BEARER1) between the MNO_ePDG and the MNO_PGW;
the MNO_ePDG engaging in setting up a first IPsec tunnel between the UE and the MNO_ePDG;
the MNO_ePDG engaging setting up a second MNO bearer (MNO_BEARER2) between the MNO ePDG (MNO_ePDG) and the MNO_PGW; and
the MNO_ePDG requesting setting up a second IPsec tunnel between the UE and the MNO_ePDG for providing differentiated services for the UE;
wherein the UE receives a request to create the second IPsec tunnel between the UE and the MNO network and wherein the UE requests resources in the NH network for setting up a second NH bearer (NH_BEARER2) between the UE and the NH_GW in response to the UE receiving the request to create the second IPsec tunnel; and
the UE and MNO_ePDG engaging in setting up the second IPsec tunnel between the UE and MNO_ePDG for providing the differentiated services.

10. Method according to claim 9, wherein the request to create the second IPsec tunnel between the UE and the MNO network comprises at least one of Traffic Filter Templates (TFT) traffic selectors and QoS class.

11. Method according to claim 9 wherein the request to create the second IPsec tunnel between the UE and the MNO network is an Internet Key Exchange (IKE) CREATE CHILD Service Association (SA) request message.

12. Method according to claim 11, wherein the CREATE CHILD SA request message comprises QoS class and Traffic Filter Templates (TFT) and wherein a TFT for uplink direction is using a TFT IKEv2 notify payload or an information element and a Bearer QoS is using QoS IKEv2 notify payload or an information element.

13. Method according to claim 9, engaging, by the MNO_ePDG, in a PGW initiated bearer modification procedure involving receiving an Update Bearer Request from the MNO_PGW, the Updated Bearer Request comprising at least one of QoS class, traffic selectors and Traffic Filter Templates (TFT);
transmitting, by the MNO_ePDG, an IKEv2 INFORMATIONAL request to the UE, the IKEv2 INFORMATIONAL request comprising one of a Traffic Filter Template (TFT) for uplink direction and Bearer QoS; and
upon receiving the IKEv2 INFORMATIONAL response from the UE,
continuing engaging, by the MNO_ePDG, in the PGW initiated bearer modification procedure involving issuing an Update Bearer Response toward the MNO_PGW, thus completing the PGW initiated bearer modification procedure for the UE.

14. Method according to claim 13, wherein the IKEv2 INFORMATIONAL request to the UE includes one of a Traffic Filter Template (TFT) for uplink direction by using TFT IKEv2 notify payload or an information element and the Bearer QoS by using QoS IKEv2 notify payload or an information element.

15. Method according to claim 9, wherein the NH network comprises a Mobility Management Entity (NH_MME) and the NH_GW.

16. A computer program product comprising a non-transitory storage medium including program code to be executed by processing circuitry of an Evolved Packed Data Gateway (MNO_ePDG) configured to operate in a Mobile Network Operator (MNO) network, whereby execution of the program code causes the MNO_ePDG to perform the method steps according to claim 1.

17. A user entity (UE) in a Neutral Host (NH) network and a Mobile Network Operator (MNO) network, the MNO network comprising an access point (MNO_AP), a Mobility Management Entity MNO_MME, a Serving Gateway (MNO_SGW), a MNO Packet Gateway (MNO_PGW) providing MNO Internet Protocol (IP) services;
the MNO network moreover comprising an Evolved Packed Data Gateway (MNO_ePDG) used to provide Packet Data Connection (PDN) services to user entities (UE) of the NH network;
the NH network comprising an access node (NH_AP), a Mobility Management Entity (NH_MME) and a NH Gateway (NH_GW);
the NH_GW being connected to the MNO_ePDG for providing connectivity to the NH_GW connecting further to MNO IP services;
the UE comprising an interface (IF_UE); a processor (PCU-UE) and a memory (MEM-UE), the UE being adapted for:
connecting to the MNO network;
finding a NH cell and engaging in setting up a connection in the NH network between the UE and the NH-AP;
establishing a first NH bearer (NH_BEARER1) between the UE and the NH_GW;
wherein the MNO_ePDG being adapted for engaging in setting up a first MNO bearer (MNO_BEARER1) between the MNO_ePDG and the MNO_PGW;
the UE engaging in setting up a first IPsec tunnel between the UE and the MNO_ePDG;

the MNO_ePDG being adapted for engaging setting up a second MNO bearer (MNO_BEARER2) between the MNO_ePDG and the MNO_PGW;

upon the MNO_ePDG requesting setting up a second IPsec tunnel between the UE and the MNO_ePDG for providing differentiated services for the UE, the UE being adapted for:

receiving a request to create the second IPsec tunnel between the UE and the MNO network;

requesting resources in the NH network for setting up a second NH bearer (NH_BEARER2) between the UE and the NH_GW in response to the UE receiving the request to create the second IPsec tunnel; and the UE engaging in setting up the second IPsec tunnel between the UE and the MNO_ePDG for providing differentiated services.

18. UE according to claim 17, wherein the request for setting up the second IPsec tunnel between the UE and the MNO_ePDG comprises a CREATE CHILD SA request; wherein the UE generates a response message comprising a CREATE CHILD SA response.

19. An Evolved Packed Data Gateway (MNO_ePDG), in a Mobile Network Operator (MNO) network, the MNO network comprising an access point (MNO_AP), a Mobility Management Entity (MNO_MME), a Serving Gateway (MNO_SGW), a MNO Packet Gateway (MNO_PGW) providing MNO Internet Protocol (IP) services;

wherein the MNO_ePDG provides Packet Data Connection (PDN) services to user entities (UE) of a Neutral Host (NH) network;

the NH network comprising an NH access node (NH-AP) communicating with the MNO_ePDG; wherein a UE is adapted for connecting to the MNO network;

the UE being adapted for finding a NH cell and engaging in setting up a connection in the NH network between the UE and the NH-AP, wherein a first NH bearer (NH_BEARER1) is established between the UE and an NH Gateway (NH_GW);

the MNO_ePDG comprising an interface (IF_EP), a processor (PCU-EP) and a memory (MEM-EP), the MNO_ePDG being configured to:

engage in setting up a first MNO bearer (MNO_BEARER1) between the MNO_ePDG and the MNO_PGW;

engage in setting up a first IPsec tunnel between the UE and the MNO_ePDG;

engage in setting up a second MNO bearer (MNO_BEARER2) between the MNO_ePDG and the MNO_PGW;

requesting setting up a second IPsec tunnel between the UE and the MNO_ePDG for providing differentiated services for the UE, wherein the UE receives a request to create the second IPsec tunnel between the UE and the MNO network and the UE requests resources in the NH network for setting up a second NH bearer (NH_BEARER2) between the UE and the NH_GW in response to the UE receiving the request to create the second IPsec tunnel; and the UE and the MNO_ePDG engaging in setting up the second IPsec tunnel between the UE and the MNO_ePDG for providing the differentiated services.

20. Evolved Packed Data Gateway (MNO_ePDG) according to claim 19, wherein the request to create the second IPsec tunnel between the UE and the MNO network comprises at least one of Traffic Filter Templates (TFT) traffic selectors and QoS class.

21. Evolved Packed Data Gateway (MNO_ePDG) according to claim 19, wherein the request to create the second IPsec tunnel between the UE and the MNO network is an Internet Key Exchange (IKE) CREATE CHILD Service Association (SA) request message.

22. Evolved Packed Data Gateway (MNO_ePDG) according to claim 21, wherein the CREATE_CHILD_SA request message comprises QoS class and Traffic Filter Templates (TFT) and wherein a TFT for up-link direction is using a TFT IKEv2 notify payload or an information element and a Bearer QoS is using QoS IKEv2 notify payload or an information element.

23. Evolved Packed Data Gateway (MNO_ePDG) according to claim 19, the MNO_ePDG moreover being adapted to:

engage in a PGW initiated bearer modification procedure involving receiving an Update Bearer Request from the MNO_PGW, the Update Bearer Request comprising at least one of QoS class, traffic selectors and Traffic Filter Templates (TFT), transmit an IKEv2 INFORMATIONAL request to the UE, the IKEv2 INFORMATIONAL request comprising one of a Traffic Filter Template (TFT) for uplink direction and Bearer QoS, and upon receiving an IKEv2 INFORMATIONAL response from the UE, continue engaging in the PGW initiated bearer modification procedure involving issuing an Update Bearer Response toward the MNO_PGW, thus completing the PGW initiated bearer modification procedure for the UE.

24. Evolved Packed Data Gateway (MNO_ePDG) according to claim 23, wherein the IKEv2 INFORMATIONAL request to the UE includes one of a Traffic Filter Template (TFT) for uplink direction by using TFT IKEv2 notify payload or an information element and the Bearer QoS by using QoS IKEv2 notify payload or an information element.

25. Evolved Packed Data Gateway (MNO_ePDG) according to claim 19, wherein the NH network moreover comprises a Mobility Management Entity (NH_MME) and a Gateway (NH_GW).

* * * * *